(12) United States Patent
Madan et al.

(10) Patent No.: US 12,562,398 B2
(45) Date of Patent: Feb. 24, 2026

(54) SAFE AND FLEXIBLE CHITOSAN-BASED GEL ELECTROLYTE IN RECHARGEABLE ZINC ELECTROLYTIC MANGANESE DIOXIDE (EMD) ALKALINE BATTERIES

(71) Applicant: UNIVERSITY OF MARYLAND, BALTIMORE COUNTY, Baltimore, MD (US)

(72) Inventors: Deepa Madan, Baltimore, MD (US); Aswani Poosapati, Baltimore, MD (US)

(73) Assignee: UNIVERSITY OF MARYLAND, BALTIMORE COUNTY, Baltimore, MD (US)

( * ) Notice: Subject to any disclaimer, the term of this patent is extended or adjusted under 35 U.S.C. 154(b) by 0 days.

(21) Appl. No.: 18/522,416

(22) Filed: Nov. 29, 2023

(65) Prior Publication Data

US 2024/0154163 A1      May 9, 2024

Related U.S. Application Data

(63) Continuation of application No. 17/508,108, filed on Oct. 22, 2021, now Pat. No. 11,870,034.

(Continued)

(51) Int. Cl.
| | |
|---|---|
| *H01M 10/0565* | (2010.01) |
| *H01M 4/04* | (2006.01) |

(Continued)

(52) U.S. Cl.
CPC ..... *H01M 10/0565* (2013.01); *H01M 4/0404* (2013.01); *H01M 4/366* (2013.01);
(Continued)

(58) Field of Classification Search
CPC ...... H01M 4/0404; H01M 4/366; H01M 4/36; H01M 4/48; H01M 4/66; H01M 4/662;
(Continued)

(56) References Cited

U.S. PATENT DOCUMENTS

| | | | | |
|---|---|---|---|---|
| 5,542,163 A | * | 8/1996 | Chang .................... | H01M 4/02 |
| | | | | 29/623.5 |
| 5,681,357 A | * | 10/1997 | Eschbach .......... | H01M 10/0565 |
| | | | | 29/623.5 |

(Continued)

FOREIGN PATENT DOCUMENTS

| | | | | | |
|---|---|---|---|---|---|
| CN | 105742760 A | * | 7/2016 | | |
| CN | 110676072 A | * | 1/2020 | ............ | C08J 5/2212 |

OTHER PUBLICATIONS

English Translation of CN 110676072 A—Electrochemical energy device and manufacturing method thereof; Jan. 10, 2020 (Year: 2020).*

(Continued)

*Primary Examiner* — Adam J Francis
(74) *Attorney, Agent, or Firm* — Casimir Jones, S.C.; Tristan A. Fuierer

(57)      ABSTRACT

Zinc electrolytic manganese dioxide (EMD) batteries including a high performing flexible chitosan-based gel electrolyte with poly-vinyl alcohol (PVA) and potassium hydroxide (KOH) additives were prepared. The Zn-EMD batteries were constructed using an optimized assembly technique employed to achieve good interfacial contact between the layers. Attaining energy densities between 150-250 Wh/kg (w.r.t cathode mass) is possible for these batteries, encouraging their use in wearable or flexible electronics. Using the chitosan-based gel electrolyte and limited voltage window testing, the prepared Zn-EMD alka-
(Continued)

line batteries are among the best reported polymer-based alkaline electrolyte Zn rechargeable batteries.

20 Claims, 8 Drawing Sheets

Related U.S. Application Data

(60) Provisional application No. 63/104,040, filed on Oct. 22, 2020.

(51) Int. Cl.
| | |
|---|---|
| *H01M 4/24* | (2006.01) |
| *H01M 4/36* | (2006.01) |
| *H01M 4/48* | (2010.01) |
| *H01M 4/66* | (2006.01) |
| *H01M 10/36* | (2010.01) |

(52) U.S. Cl.
CPC ............ *H01M 4/48* (2013.01); *H01M 4/662* (2013.01); *H01M 4/663* (2013.01); *H01M 10/36* (2013.01); *H01M 4/244* (2013.01); *H01M 2300/0082* (2013.01); *H01M 2300/0085* (2013.01)

(58) Field of Classification Search
CPC ........ H01M 4/663; H01M 4/244; H01M 4/24; H01M 4/62; H01M 4/624; H01M 4/661; H01M 4/26; H01M 4/04; H01M 10/0565; H01M 10/36; H01M 10/0468; H01M 10/26; H01M 10/04; H01M 2300/0082; H01M 2300/0085
See application file for complete search history.

(56) References Cited

U.S. PATENT DOCUMENTS

| | | | |
|---|---|---|---|
| 9,379,373 | B2 | 6/2016 | Banerjee et al. |
| 10,199,639 | B2 | 2/2019 | Yadav et al. |
| 10,211,491 | B2 | 2/2019 | Turney et al. |
| 10,276,860 | B2 | 4/2019 | Yadav et al. |
| 11,870,034 | B2 | 1/2024 | Madan et al. |
| 2012/0276434 | A1* | 11/2012 | Gaikwad ............... H01M 10/34 |
| | | | 29/623.5 |

OTHER PUBLICATIONS

Alias, S. S., Chee, S. M., & Mohamad, A. A., 2017. Chitosan-ammonium acetate-ethylene carbonate membrane for proton batteries. Arabian Journal of Chemistry, 10, S3687-S3698. http://doi.org/10.1016/j.arabjc.2014.05.001.

Aziz, S. B., Abdullah, O. G., Rasheed, M. A., & Ahmed, H. M., 2017. Effect of high salt concentration (HSC) on structural, morphological, and electrical characteristics of chitosan based solid polymer electrolytes. Polymers, 9(6), 187. http://doi.org/10.3390/polym9060187.

Bajpai, M., Bajpai, S. K., & Jyotishi, P., 2016. Water absorption and moisture permeation properties of chitosan/poly (acrylamide-co-itaconic acid) IPC films. International journal of biological macromolecules, 84, 1-9. http://doi.org/10.1016/j.ijbiomac.2015.11.088. Abstract Only.

Bhad, S. N., & Sangawar, V. S., 2012. Synthesis and study of PVA based gel electrolyte. Chem Sci Trans, 1(3), 653-657. http://doi.org/10.7598/cst2012.253.

Biswal, A., Tripathy, B. C., Sanjay, K., Subbaiah, T., & Minakshi, M., 2015. Electrolytic manganese dioxide (EMD): a perspective on worldwide production, reserves and its role in electrochemistry. RSC Advances, 5(72), 58255-58283. http://doi.org/10.1039/C5RA05892A.

Chai, L., Qu, Q., Zhang, L., Shen, M., Zhang, L., & Zheng, H., 2013. Chitosan, a new and environmental benign electrode binder for use with graphite anode in lithium-ion batteries. Electrochimica Acta, 105, 378-383. http://doi.org/10.1016/j.electacta.2013.05.009.

Chupp, J., Shellikeri, A., Palui, G., & Chatterjee, J., 2015. Chitosan-based gel film electrolytes containing ionic liquid and lithium salt for energy storage applications. Journal of Applied Polymer Science, 132(26). http://doi.org/10.1002/app.42143.

Dunn, B., Kamath, H., & Tarascon, J. M., 2011. Electrical energy storage for the grid: a battery of choices. Science, 334(6058), 928-935. http://doi.org/10.1126/science.1212741.

English Translation of CN110676072A, Electrochemical energy device and manufacturing method thereof; Shanghai Yuancheng Automobile Tech Co LTD; Jan. 10, 2020 (Year:2020).

Fan, L., Wang, M., Zhang, Z., Qin, G., Hu, X., & Chen, Q., 2018. Preparation and Characterization of PVA Alkaline Solid Polymer Electrolyte with Addition of Bamboo Charcoal. Materials, 11(5), 679. http://doi.org/10.3390/ma11050679.

Fauvarque, J. F., Guinot, S., Bouzir, N., Salmon, E., & Penneau, J. F., 1995. Alkaline poly (ethylene oxide) solid polymer electrolytes. Application to nickel secondary batteries. Electrochimica Acta, 40(13-14), 2449-2453. http://doi.org/10.1016/0013-4686(95)00212-W.

Feldman, D., & Barbalata, A., 1996. Synthetic polymers: technology, properties, applications. Springer Science & Business Media. Book, Only Cover Provided.

Guinot, S., Salmon, E., Penneau, J. F., & Fauvarque, J. F., 1998. A new class of PEO-based SPEs: structure, conductivity and application to alkaline secondary batteries. Electrochimica Acta, 43(10-11), 1163-1170. http://doi.org/10.1016/S0378-7753(02)00438-X.

Guisao, J. P. T., & Romero, A. J. F., 2015. Interaction between Zn2+ cations and n-methyl-2-pyrrolidone in ionic liquid-based Gel Polymer Electrolytes for Zn batteries. Electrochimica Acta, 176, 1447-1453. http://doi.org/10.1016/j.electacta.2015.07.132.

Guo, F., Gupta, N., & Teng, X., 2018. Enhancing Pseudocapacitive Process for Energy Storage Devices: Analyzing the Charge Transport Using Electro-kinetic Study and Numerical Modeling. Supercapacitors: Theoretical and Practical Solutions, 87. http://doi.org/10.5772/intechopen.73680.

Hagan, W. P., Latham, R. J., Linford, R. G., & Vickers, S. L., 1994. Zinc polymer electrolytes in battery systems. Solid State Ionics, 70-71, 666-669. http://doi.org/10.1016/0167-2738(94)90391-3.

Ho, C. C., Evans, J. W., & Wright, P. K., 2010. Direct write dispenser printing of a zinc microbattery with an ionic liquid gel electrolyte. Journal of Micromechanics and Microengineering, 20(10), 104009. http://doi.org/10.1088/0960-1317/20/10/104009.

Huang, J., Yadav, G. G., Gallaway, J. W., Wei, X., Nyce, M., & Banerjee, S., 2017. A calcium hydroxide interlayer as a selective separator for rechargeable alkaline Zn/MnO2 batteries. Electrochemistry Communications, 81, 136-140. http://doi.org/10.1016/j.elecom.2017.06.020. Abstract Only.

Jacoby, M., 2013. Assessing the safety of lithium-ion batteries. Chem. Eng. News, 91, 33-37.

Jiao, T., Yang, Q., Wu, S., Wang, Z., Chen, D., Shen, D., . . . & Zhi, C., 2019. Binder-free hierarchical VS 2 electrodes for high-performance aqueous Zn ion batteries towards commercial level mass loading. Journal of Materials Chemistry A, 7(27), 16330-16338. http://doi.org/10.1039/C9TA04798K.

Jinchao Huang, Immobilizing Zincate Ions for Long-Cycle High-Energy-Density Aqueous Batteries, Ph.D. Dissertation, 2019.

Kadir, M. F. Z., & Arof, A. K., 2011. Application of PVA-chitosan blend polymer electrolyte membrane in electrical double layer capacitor. Materials Research Innovations, 15(sup2), s217-s220. http://doi.org/10.1179/143307511X13031890749299. Abstract Only.

Kadir, M. F. Z., Majid, S. R., & Arof, A. K., 2010. Plasticized chitosan-PVA blend polymer electrolyte-based proton battery. Electrochimica Acta, 55(4), 1475-1482. http://doi.org/10.1016/j.electacta.2009.05.011.

Kumar, G. G., & Sampath, S., 2003. Electrochemical characterization of poly (vinylidenefluoride)-zinc triflate gel polymer electrolyte and its application in solid-state zinc batteries. Solid State Ionics, 160(3-4), 289-300. http://doi.org/10.1016/S0167-2738(03)00209-1.

(56)         References Cited

OTHER PUBLICATIONS

Kumar, G. G., & Sampath, S., 2003. Electrochemical characterization of a zinc-based gel-polymer electrolyte and its application in rechargeable batteries. Journal of The Electrochemical Society, 150(5), A608-A615. http://doi.org/10.1149/1.1566017.

Kundu, D., Adams, B. D., Duffort, V., Vajargah, S. H., & Nazar, L. F., 2016. A high-capacity and long-life aqueous rechargeable zinc battery using a metal oxide intercalation cathode. Nature Energy, 1(10), 1-8. http://doi.org/10.1038/nenergy.2016.119.

Larcher, D., & Tarascon, J. M., 2015. Towards greener and more sustainable batteries for electrical energy storage. Nature chemistry, 7(1), 19. http://doi.org/10.1038/nchem.2085.

Lewandowski, A., Skorupska, K., & Malinska, J., 2000. Novel poly (vinyl alcohol)-KOH-H2O alkaline polymer electrolyte. Solid state ionics, 133(3-4), 265-271. http://doi.org/10.1016/S0167-2738(00)00733-5.

Li, H., Han, C., Huang, Y., Huang, Y., Zhu, M., Pei, Z., . . . & Wang, Y., 2018. An extremely safe and wearable solid-state zinc ion battery based on a hierarchical structured polymer electrolyte. Energy & Environmental Science, 11(4), 941-951. http://doi.org/10.1039/C7EE03232C.

Li, H., Ma, L., Han, C., Wang, Z., Liu, Z., Tang, Z., & Zhi, C., 2019. Advanced rechargeable zinc-based batteries: Recent progress and future perspectives. Nano Energy. http://doi.org/10.1016/j.nanoen.2019.05.059. Abstract Only.

Li, Z., Young, D., Xiang, K., Carter, W. C., & Chiang, Y. M., 2013. Towards high power high energy aqueous sodium-ion batteries: the NaTi2 (PO4)3/Na0.44MnO2 system. Advanced Energy Materials, 3(3), 290-294. http://doi.org/10.1002/aenm.201200598.

Lu, K., Song, B., Zhang, Y., Ma, H., & Zhang, J., 2017. Encapsulation of zinc hexacyanoferrate nanocubes with manganese oxide nanosheets for high-performance rechargeable zinc ion batteries. Journal of Materials Chemistry A, 5(45), 23628-23633. http://doi.org/10.1039/C7TA07834J.

Mehta, S. A., Bonakdarpour, A., & Wilkinson, D. P., 2017. Impact of cathode additives on the cycling performance of rechargeable alkaline manganese dioxide-zinc batteries for energy storage applications. Journal of Applied Electrochemistry, 47(2), 167-181. http://doi.org/10.1007/s10800-016-1034-1.

Merle, G., Hosseiny, S. S., Wessling, M., & Nijmeijer, K., 2012. New cross-linked PVA based polymer electrolyte membranes for alkaline fuel cells. Journal of membrane science, 409, 191-199. http://doi.org/10.1016/j.memsci.2012.03.056.

Minakshi, M., Mitchell, D. R., Carter, M. L., Appadoo, D., & Nallathamby, K., 2009. Microstructural and spectroscopic investigations into the effect of CeO2 additions on the performance of a MnO2 aqueous rechargeable battery. Electrochimica acta, 54(12), 3244-3249. http://doi.org/10.1016/j.electacta.2008.12.029.

Ming, J., Guo, J., Xia, C., Wang, W., & Alshareef, H. N., 2019. Zinc-ion batteries: Materials, mechanisms, and applications. Materials Science and Engineering: R: Reports, 135, 58-84. http://doi.org/10.1016/j.mser.2018.10.002.

Mohamad, A. A., Mohamed, N. S., Yahya, M. Z. A., Othman, R., Ramesh, S., Alias, Y., & Arof, A. K., 2003. Ionic conductivity studies of poly (vinyl alcohol) alkaline solid polymer electrolyte and its use in nickel-zinc cells. Solid State Ionics, 156(1-2), 171-177. http://doi.org/10.1016/S0167-2738(02)00617-3.

Molyneux, P., 2018. Water-soluble synthetic polymers: vol. II: properties and behavior. CRC press. Book, Only Cover Provided.

Mulchandani, N., Shah, N., & Mehta, T., 2017. Synthesis of chitosan-polyvinyl alcohol copolymers for smart drug delivery application. Polymers and Polymer Composites, 25(3), 241-246. http://doi.org/10.1177/096739111702500311.

N. Zhang et al., Rechargeable aqueous zinc-manganese dioxide batteries with high energy and power densities, Nature Comm., 2017, 8.

Navaratnam, S., Ramesh, K., Ramesh, S., Sanusi, A., Basirun, W. J., & Arof, A. K., 2015. Transport mechanism studies of chitosan electrolyte systems. Electrochimica Acta, 175, 68-73. http://doi.org/10.1016/j.electacta.2015.01.087.

Nesvaderani, F., Bonakdarpour, A., & Wilkinson, D. P., 2017. pH-Controlled Electrolysis of Electrolytic Manganese Dioxide (EMD) for Improved Cycle Life of Rechargeable MnO2/Zn Batteries. Journal of The Electrochemical Society, 164(4), A810-A819. http://doi.org/10.1149/2.0951704jes.

Pan, H., Ellis, J. F., Li, X., Nie, Z., Chang, H. J., & Reed, D., 2019. Electrolyte Effect on the Electrochemical Performance of Mild Aqueous Zinc-Electrolytic Manganese Dioxide Batteries. ACS applied materials & interfaces, 11(41), 37524-37530. http://doi.org/10.1021/acsami.9b09252.

Park, J., Park, M., Nam, G., Lee, J. S., & Cho, J., 2015. All-solid-state cable-type flexible zinc-air battery. Advanced Materials, 27(8), 1396-1401. http://doi.org/10.1002/adma.201404639.

Patel, S. K., Awadhia, A., & Agrawal, S. L., 2009. Thermal and electrical studies on composite gel electrolyte system: PEG-PVA-(NH4CH2CO2) 2. Phase Transitions, 82(6), 421-432. http://doi.org/10.1080/01411590902722363.

Poosapati, A., Jang, E., Madan, D., Jang, N., Hu, L., & Lan, Y., 2019. Cellulose hydrogel as a flexible gel electrolyte layer. MRS Communications, 9(1), 122-128. http://doi.org/10.1557/mrc.2019.9. Abstract Only.

Poosapati, A., Negrete, K., Jang, N., Hu, L., Lan, Y., & Madan, D., 2019. Wood cellulose-based thin gel electrolyte with enhanced ionic conductivity. MRS Communications, 9(3), 1015-1021. http://doi.org/10.1557/mrc.2019.79. Abstract Only.

Powers, R. W., & Breiter, M. W., 1969. The anodic dissolution and passivation of zinc in concentrated potassium hydroxide solutions. Journal of the Electrochemical Society, 116(6), 719-729. http://doi.org/10.1149/1.2412040.

Rinaudo, M., 2006. Chitin and chitosan: properties and applications. Progress in polymer science, 31(7), 603-632. http://doi.org/10.1016/j.progpolymsci.2006.06.001.

Santos, F., Tafur, J. P., Abad, J., & Romero, A. J. F., 2019. Structural modifications and ionic transport of PVA-KOH hydrogels applied in Zn/Air batteries. Journal of Electroanalytical Chemistry, 850, 113380. http://doi.org/10.1016/j.jelechem.2019.113380.

Seo, J. K., Shin, J., Chung, H., Meng, P. Y., Wang, X., & Meng, Y. S., 2018. Intercalation and conversion reactions of nanosized β-MnO2 cathode in the secondary Zn/MnO2 alkaline battery. The Journal of Physical Chemistry C, 122(21), 11177-11185. http://doi.org/10.1021/acs.jpcc.7b11685.

Shukur, M. F., Ithnin, R., Illias, H. A., & Kadir, M. F. Z., 2013. Proton conducting polymer electrolyte based on plasticized chitosan-PEO blend and application in electrochemical devices. Optical Materials, 35(10), 1834-1841. http://doi.org/10.1016/j.optmat.2013.03.004. Abstract Only.

Smitha, B., Sridhar, S., & Khan, A. A., 2004. Polyelectrolyte complexes of chitosan and poly (acrylic acid) as proton exchange membranes for fuel cells. Macromolecules, 37(6), 2233-2239. http://doi.org/10.1021/ma0355913.

Subban, R. H. Y., Arof, A. K., & Radhakrishna, S., 1996. Polymer batteries with chitosan electrolyte mixed with sodium perchlorate. Materials Science and Engineering: B, 38(1-2), 156-160. http://doi.org/10.1016/0921-5107(95)01508-6.

Tripathi, S., Mehrotra, G. K., & Dutta, P. K., 2009. Physicochemical and bioactivity of cross-linked chitosan-PVA film for food packaging applications. International Journal of Biological Macromolecules, 45(4), 372-376. http://doi.org/10.1016/j.ijbiomac.2009.07.006. Abstract Only.

Tsuchida, E., Ohno, H., & Tsunemi, K., 1983. Conduction of lithium ions in polyvinylidene fluoride and its derivatives—I. Electrochimica Acta, 28(5), 591-595. http://doi.org/10.1016/0013-4686(83)85049-X.

Tsunemi, K., Ohno, H., & Tsuchida, E., 1983. A mechanism of ionic conduction of poly (vinylidene fluoride)-lithium perchlorate hybrid films. Electrochimica Acta, 28(6), 833-837. http://doi.org/10.1016/0013-4686(83)85155-X.

Wang, Z., Winslow, R., Madan, D., Wright, P. K., Evans, J. W., Keif, M., & Rong, X., 2014. Development of MnO2 cathode inks for flexographically printed rechargeable zinc-based battery. Journal of Power Sources, 268, 246-254. http://doi.org/10.1016/j.jpowsour.2014.06.032. Abstract Only.

(56) References Cited

OTHER PUBLICATIONS

Wanger, T. C., 2011. The Lithium future-resources, recycling, and the environment. Conservation Letters, 4(3), 202-206. http://doi.org/10.1111/j.1755-263X.2011.00166.x.

Wessells, C. D., Peddada, S. V., Huggins, R. A., & Cui, Y., 2011. Nickel hexacyanoferrate nanoparticle electrodes for aqueous sodium and potassium ion batteries. Nano letters, 11(12), 5421-5425. http://doi.org/10.1021/nl203193q.

Wu, G. M., Lin, S. J., & Yang, C. C., 2006. Alkaline Zn-air and Al-air cells based on novel solid PVA/PAA polymer electrolyte membranes. Journal of Membrane Science, 280(1-2), 802-808. http://doi.org/10.1016/j.memsci.2006.02.037.

Yadav, G. G., Cho, J., Turney, D., Hawkins, B., Wei, X., Huang, J., . . . & Nyce, M., 2019. Going beyond Intercalation Capacity of Aqueous Batteries by Exploiting Conversion Reactions of Mn and Zn electrodes for Energy-Dense Applications. Advanced Energy Materials, 9(48), 1902270. http://doi.org/10.1002/aenm.201902270.

Yadav, G. G., Gallaway, J. W., Turney, D. E., Nyce, M., Huang, J., Wei, X., & Banerjee, S. , 2017. Regenerable Cu-intercalated MnO 2 layered cathode for highly cyclable energy dense batteries. Nature communications, 8(1), 1-9. http://doi.org/10.1038/ncomms14424.

Yadav, G. G., Wei, X., Huang, J., Gallaway, J. W., Turney, D. E., Nyce, M., . . . & Banerjee, S., 2017. A conversion-based highly energy dense Cu 2+ intercalated Bi-birnessite/Zn alkaline battery. Journal of Materials Chemistry A, 5(30), 15845-15854. http://doi.org/10.1039/C7TA05347A.

Yadav, G. G., Wei, X., Huang, J., Turney, D., Nyce, M., & Banerjee, S., 2018. Accessing the second electron capacity of MnO2 by exploring complexation and intercalation reactions in energy dense alkaline batteries. International Journal of Hydrogen Energy, 43(17), 8480-8487. http://doi.org/10.1016/j.ijhydene.2018.03.061.

Yahya, M. Z. A., Harun, M. K., Ali, A. M. M., Mohammat, M. F., Hanafiah, M. A. K. M., Ibrahim, S. C., . . . & Latif, F., 2006. XRD and surface morphology studies on chitosan-based film electrolytes. Journal of applied sciences, 6(15), 3150-3154. http://doi.org/10.3923/jas.2006.3150.3154.

Yamagata, M., Soeda, K., Ikebe, S., Yamazaki, S., & Ishikawa, M., 2013. Chitosan-based gel electrolyte containing an ionic liquid for high-performance nonaqueous supercapacitors. Electrochimica Acta, 100, 275-280. http://doi.org/10.1016/j.electacta.2012.05.073.

Yang, C. C., & Lin, S. J., 2002. Alkaline composite PEO-PVA-glass-fibre-mat polymer electrolyte for Zn-air battery. Journal of Power Sources, 112(2), 497-503. http://doi.org/.

Yang, Jen Ming, Fan, Chih-sheng, Wang, Nian-Ci, Chang, Yen-Hsiang, Evaluation of membrane preparation on the performance of alkaline polymer electrolyte: Comparison between poly(vinyl alcohol)/chitosan blended membrane and poly(vinyl alcohol)/chitosan electrospun nanofiber composite . . . Dec. 2, 2017 (Year: 2017).

Yusof, Y. M., Illias, H. A., & Kadir, M. F. Z., 2014. Incorporation of NH 4 Br in PVA-chitosan blend-based polymer electrolyte and its effect on the conductivity and other electrical properties. Ionics, 20(9), 1235-1245. http://doi.org/10.1007/s11581-014-1096-1.

Zhang, S. S., 2007. A review on the separators of liquid electrolyte Li-ion batteries. Journal of power sources, 164(1), 351-364. http://doi.org/10.1016/j.jpowsour.2006.10.065.

Non-Final Office for U.S Appl. No. 17/508,108, dated Mar. 28, 2023 (11 pages).

* cited by examiner

*current collectors*

*Cathode*

*Gel Electrolyte*

*Zn foil*

SAFE AND FLEXIBLE CHITOSAN-BASED GEL ELECTROLYTE IN RECHARGEABLE ZINC ELECTROLYTIC MANGANESE DIOXIDE (EMD) ALKALINE BATTERIES

CROSS REFERENCE TO RELATED APPLICATIONS

This application is a continuation application and claims priority of U.S. patent application Ser. No. 17/508,108 filed on Oct. 22, 2021, which claims priority to U.S. Provisional Patent Application No. 63/104,040 filed on Oct. 22, 2020 in the name of Deepa Madan and Aswani Poosapati and entitled "Safe and Flexible Chitosan-Based Gel Electrolyte in Rechargeable Zinc Electrolytic Manganese Dioxide (EMD) Alkaline Batteries," both of which are hereby incorporated by reference herein in their entirety.

FIELD

The present invention relates to a chitosan-based polymer gel electrolyte as well as a zinc-based battery comprising said chitosan-based polymer gel electrolyte and a method of making same. The zinc-based battery is nonflammable, nontoxic, highly mechanically stable, and rechargeable.

BACKGROUND

The need for reliable, scalable, and efficient rechargeable batteries for storage purposes has prominently driven research towards it for decades now [1, 2]. Recently, significant attention has been directed towards multivalent cation intercalation chemistries such as $Zn^{2+}$, $Mg^{2+}$, $Ca^{2+}$ and $Al^{3+}$ [6-9], due to the advantages of their multiple electron transfers. Among these, $Zn^{2+}$ based batteries have gained more popularity due to the abundance of metallic zinc, which has low toxicity, is intrinsically safe, has a reliable electrochemical performance, has a smaller ionic radius (0.88 Å), has a high volumetric capacity (5850 $mAh/cm^3$) and is able to remain stable in ambient air [5, 6].

Polymer-based electrolytes have attracted significant attention due to their added advantages such as non-toxicity, no leakage issues, elimination of the need for separators, provision of longer cycle life by suppressing dendrite propagation through mechanical force, are lightweight, and also boost their application in flexible energy storage systems [5, 6, 10-30]. Decent performances of polymer electrolytes are already reported but most of these gel preparation processes involve complex stages for synthesis and are energy intensive [11-26]. In addition, issues such as the polymer itself acting as an insulator at lower temperatures due to blockages from their crystalline nature, limited flexibility, high interfacial resistance due to poor solubility of salts, and poor adhesion between electrolytes and electrodes have been observed [11, 12, 22, 24]. Another interesting observation is that most polymer electrolytes are synthetic, which are widely known for their very slow degradation rate leading to unintended environmental waste footprint [27, 28].

There is a continued need for batteries that comprise nontoxic materials, are highly rechargeable, and are flexible, allowing them to have numerous potential storage applications in flexible and wearable electronics.

SUMMARY

In one aspect, a solid chitosan-based polymer gel electrolyte having an amorphous solid structure comprising chitosan, polyvinyl alcohol (PVA), and potassium hydroxide (KOH) is described.

In another aspect, a method of making a zinc-based battery is described, said method comprising:

activating two separate flexible current collectors;

coating a first activated current collector with a cathode ink layer;

soaking a solid chitosan-based polymer gel electrolyte, having an amorphous solid structure comprising chitosan, PVA and KOH, in a KOH solution for an interval of time to yield a swollen gel electrolyte;

dipping the swollen gel electrolyte in a chitosan-based polymer gel electrolyte solution to substantially coat all sides of the swollen gel electrolyte and positioning the dipped swollen gel electrolyte onto the cathode ink layer;

positioning a zinc layer onto the dipped swollen gel electrolyte layer; and positioning a second activated current collector onto the zinc layer to yield the zinc-based battery.

In still another aspect, a zinc-based battery is described, said zinc-based battery comprising a first flexible current collector, a cathode ink layer, a substantially coated swollen gel electrolyte, a zinc layer, and a second flexible current collector, wherein the substantially coated swollen gel electrolyte comprises an amorphous solid structure comprising chitosan, PVA and KOH, with KOH solution in its pores, and a substantial coating of chitosan-based polymer gel electrolyte solution.

Other aspects, features and embodiments of the invention will be more fully apparent from the ensuing disclosure and appended claims.

DETAILED DESCRIPTION, AND PREFERRED EMBODIMENTS THEREOF

Figures 1A, 1B:
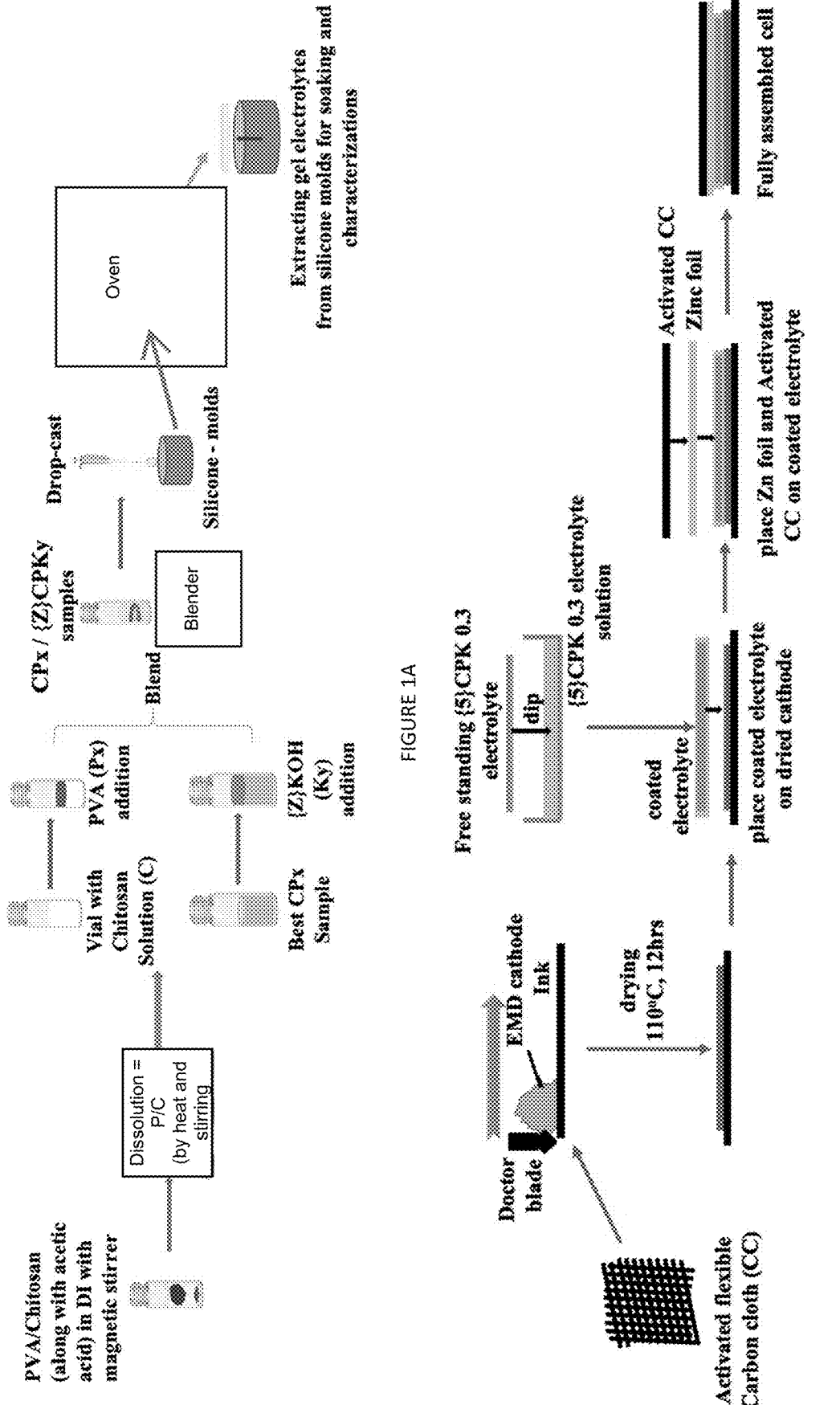
FIG. 1A is a schematic of the stages involved in electrolyte preparation.
FIG. 1B is a schematic of the stages involved in cell assembly.
Figure 1C:
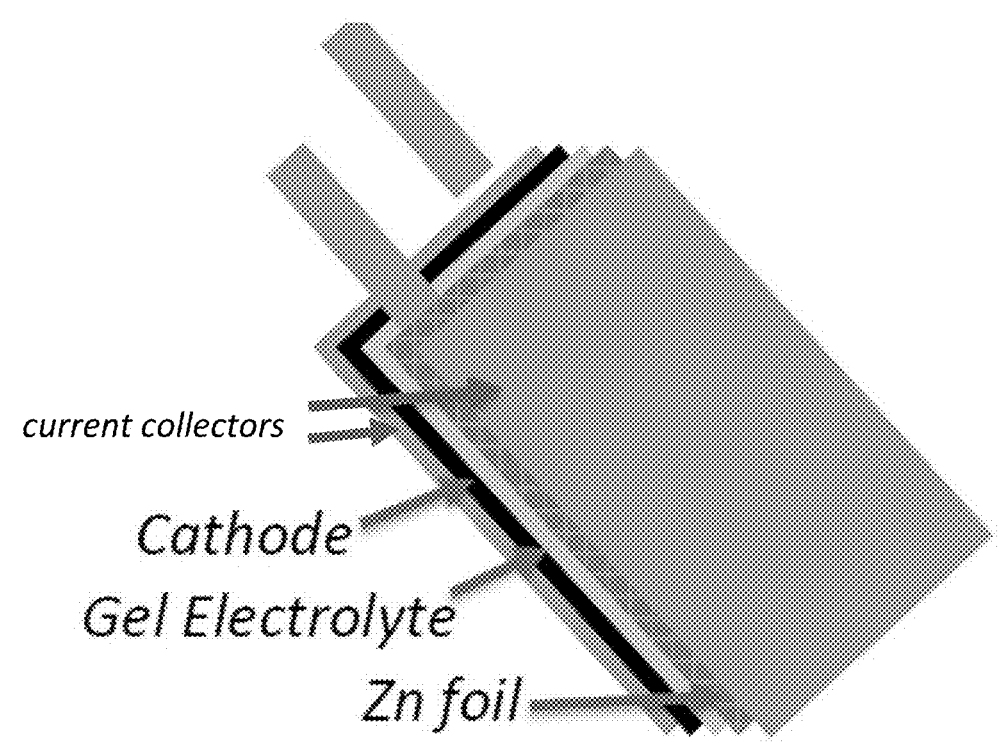
FIG. 1C is a schematic of the Zn-EMD battery described herein complete with the terminals.

The present disclosure relates to the preparation and characterization of a chitosan-based polymer gel electrolyte and its application in Zn-EMD batteries. Chitosan was chosen due to its ease of preparation, natural abundance, eco-friendliness, environmentally benign nature, and its high degree of functionality that is not available in most synthetic polymers [31]. Chitosan has been used in the medical industry, as electrode binders in supercapacitors, as binder and polymer electrolyte in Li-based batteries and in biosensors [31-41], but to the present inventors' knowledge, has never been incorporated as an electrolyte in zinc-based rechargeable batteries. The pristine chitosan ionic conductivity is approximately $10^{-6}$ S/cm, which is at least two orders of magnitude higher than the conventionally used synthetic polymers (e.g., PEO, PVP, etc.), probably due to its amorphous nature. The self-gelatinous nature of chitosan also facilitates film preparation [31].

The chitosan-based polymer gel electrolyte described herein is a stable, flexible, and high ionically conducting film comprising polyvinyl alcohol (PVA) and potassium hydroxide (KOH) additives. PVA was chosen due to its ability to form thin films, ready solubility in water, good solvent retention capacity, and high temperature stability, and KOH was chosen due to its fast-electrochemical kinetics, proven ability to increase ionic conductivities and high solubility of zinc salts therein [11-13, 15, 18, 19, 24, 25, 29, 30, 34, 39, 42]. As will be discussed herein, a best average ionic conductivity of 457.19 mS/cm was obtained for chitosan polymer electrolyte films with 150-220 µm thickness using PVA and KOH additives. This best performing chitosan polymer electrolyte film was chosen for developing a Zn-based rechargeable battery.

A Zn—MnO$_2$ chemistry is particularly chosen for development due to its safety, abundant availability, non-flammability, high output voltage (1.5-2V), mercury-free nature, comparable areal capacities (1-4 mAh/cm$^2$) and high capacity for utilization (Zn-820 mAh/g, MnO$_2$-617 mAh/g) [43-

46]. Among the various forms of manganese dioxide, i.e., natural manganese dioxide (NMD), chemical manganese dioxide (CMD), and electrolytic manganese dioxide (EMD, also termed γ-EMD), EMD was chosen for battery construction because it is the more chemically and electrochemically active polymorph of MnO$_2$ (γ-MnO$_2$) [44-48]. Despite EMDs favorable attributes, i.e., low production cost, low toxicity, high capacity, and natural abundance, there remain challenges involving its cycle life due to irreversible polymorphic changes in the chemical structure of γ-MnO$_2$ to δ-MnO$_2$ after initial discharge [43-46, 48]. However, recent advancements in cell architecture and electrolyte flow achieved along with either limiting potentials, increasing charge rates and/or use of additives for this chemistry as a rechargeable system have shown to improve the cell performance [43-45, 48-50]. It should be appreciated by the skilled artisan that although reference is made to the use of EMD in the zinc-based batteries described herein, it is conceivable to use either NMD or CMD in the zinc-based batteries described herein.

As used in the present application, "zinc-based battery," "zinc-based rechargeable battery" and "Zn-EMD battery" are intended to mean the same thing.

As defined herein, the solid chitosan-based polymer gel electrolyte is what is obtained when the chitosan-based polymer gel electrolyte solution undergoes solidification, for example using drop-casting or the like. The chitosan-based polymer gel electrolyte solution is a viscous solution that is useful during the process of fabricating the zinc-based battery.

"Substantially devoid" is defined herein to mean that none of the indicated additives is intentionally added to or present in the zinc-based battery described herein.

Where the processes describe drop-casting, it should be appreciated by the skilled artisan that other techniques such as spin coating or screen printing, or the like, can be used as an alternative. Where the processes describe using a doctor blade, it should be appreciated by the skilled artisan that other techniques such as screen printing, or the like, can be used as an alternative.

As defined herein, a "swollen gel electrolyte" has a swelling ratio of at least 1.0, preferably at least 1.5, more preferably at least 1.8, and most preferably at least 2.0, wherein the swelling ratio is introduced below. The swollen gel electrolyte comprises an amorphous solid structure comprising chitosan, PVA and KOH, KOH solution in its pores, and a chitosan-based polymer gel electrolyte solution (which is a mixture of chitosan, PVA, and KOH) coating.

As defined herein, a "substantial coating" of the swollen gel electrolyte corresponds to a complete or near complete coating of the chitosan-based gel electrolyte solution on at least the faces of the swollen gel electrolyte that are in contact with the cathode ink layer and the zinc layer.

Broadly, a chitosan-based gel electrolyte is described herein. Using the chitosan-based gel electrolyte, a Zn-based rechargeable battery comprising EMD as the active cathode material was constructed using a novel cell assembly technique to attain a good contact between the solid-state gel electrolyte and electrode layers.

In a first aspect, a chitosan-based polymer is disclosed, said chitosan-based polymer comprising chitosan and polyvinyl alcohol (PVA) having a weight ratio of chitosan:PVA of about 1: (0.1-0.4), preferably about 1: (0.15-0.25), and even more preferably about 1:0.2. To produce the chitosan-based polymer of the first aspect, a homogeneous solution of chitosan and PVA, at the claimed weight ratios, can be drop-casted into a mold, and the gel can be dried to yield a dried chitosan-based polymer. That said, for the process described herein, a homogeneous solution of chitosan and PVA, at the claimed weight ratios, without drop-casting and drying, is what is used in the second aspect described hereinafter.

In a second aspect, a chitosan-based polymer gel electrolyte is disclosed, said chitosan-based polymer gel electrolyte comprising chitosan, polyvinyl alcohol (PVA), and potassium hydroxide (KOH), having (i) a weight ratio of chitosan: PVA of about 1: (0.1-0.4), preferably about 1: (0.15-0.25), and even more preferably about 1:0.2, and (ii) a weight ratio of (chitosan-PVA):KOH of about 1: (0.2-0.4), preferably about 1: (0.25-0.35), and most preferably 1: (0.3). To produce the chitosan-based polymer gel electrolyte of the second aspect (CPK), a the solution of the first aspect (CP) comprising chitosan and PVA in the claimed weight ratios is combined with an amount of KOH, preferably in a range from 4 M to 6 M KOH, to yield the claimed weight ratios, mixed to form a chitosan-based polymer gel electrolyte solution, drop-casted, and dried. The dried solid chitosan-based polymer gel electrolyte has an amorphous solid structure comprising chitosan, PVA, and KOH and a thickness in the range from about 100 μm to about 500 μm, preferably about 150-250 μm. Advantageously, the naturally occurring chitosan forms a highly ionically conducting (e.g., greater than 400 mS/cm) alkaline polymer electrolyte that is strong and ductile and has superior stability under 50° C. and 2 V. Advantageously, non-drop-casted chitosan-based polymer gel electrolyte solution is useful during the zinc-based battery manufacturing process. It should be appreciated that other alkali hydroxides such as NaOH can be used instead of KOH.

Preferably, prior to incorporation in the zinc-based battery described herein, the dried solid chitosan-based polymer gel electrolyte is soaked in KOH, for example having the same molarity as that used to produce the chitosan-based polymer gel electrolyte (e.g., in a range from 4 M to 6 M), to yield a swollen gel electrolyte. The solid chitosan-based polymer gel electrolyte is amorphous and acts like a sponge, absorbing the KOH into its pores, thus becoming swollen. Soaking times vary from about 15 min to about 3 hrs, preferably about 30 minutes to about 90 minutes. By soaking in the KOH, the performance of the final zinc-based battery improves. A swelling ratio can be determined, wherein the solid chitosan-based polymer gel electrolyte is weighed prior to soaking (W1), the solid chitosan-based polymer gel electrolyte is soaked in the KOH solution for an interval of time, and the swollen gel electrolyte weighed after soaking (W2). A swelling ratio (SR) can be determined using the relationship: $SR=(W2-W1)/W1$. Preferably, the swelling ratio is at least 1.0, preferably at least 1.5, more preferably at least 1.8, and most preferably at least 2.0. In one embodiment, the solid chitosan-based polymer gel electrolyte is soaked in a KOH solution having a molarity in a range from about 4 M to about 6 M for about 30-60 minutes, and the swelling ratio is at least 1.5, more preferably at least 1.8, and most preferably at least 2.0. It should be appreciated that the solid chitosan-based polymer gel electrolyte doesn't have to be soaked prior to incorporation in the battery, but it is preferred. It also should be appreciated that other alkali hydroxides such as NaOH can be used instead of KOH.

In a third aspect, a method of making a zinc-based battery is disclosed, said method comprising:
  activating two separate flexible current collectors;
  coating a first activated current collector with a cathode ink layer;

soaking a solid chitosan-based polymer gel electrolyte, having an amorphous solid structure comprising chitosan, PVA and KOH, in a KOH solution for an interval of time to yield a swollen gel electrolyte;
dipping the swollen gel electrolyte in a chitosan-based polymer gel electrolyte solution to substantially coat all sides of the swollen gel electrolyte and positioning the dipped swollen gel electrolyte onto the cathode ink layer;
positioning a zinc layer onto the dipped swollen gel electrolyte layer; and
positioning a second activated current collector onto the zinc layer to yield the zinc-based battery.

In the method of the third aspect, preferably the flexible anodic and cathodic current collectors comprise carbon cloth or a foil comprising nickel or an alloy thereof. Carbon cloth can be activated using nitric acid, but other means of activation are readily understood by the person skilled in the art. Preferably, the cathode ink layer comprises electrolytic manganese dioxide (EMD). In one embodiment, an EMD cathode ink comprises EMD powder, at least one conducting agent (e.g., a conductive black such as Ketjenblack), chitosan solution (binder), optionally at least one dispersing agent, and water. To produce the EMD cathode ink, at least three ingredients are mixed and/or milled in a weight ratio of about 65-75 EMD powder:15-25 Ketjenblack:5-15 chitosan solution, followed by the addition of water to produce a viscous ink The at least one dispersing agent can be added, when necessary, to substantially prevent agglomerations. Other EMD cathode ink formulations are readily envisioned for use. The EMD cathode ink is preferably homogeneous and has a final viscosity that permits it to be coated onto the flexible anodic and cathodic current collectors, for example using a doctor blade or the like. It should be appreciated that the chitosan-based polymer gel electrolyte of the third aspect can correspond to that described in the second aspect, or can be some other chitosan-based polymer gel electrolyte. In a preferred embodiment, the zinc layer is a foil comprising zinc or an alloy thereof. Once the zinc-based battery has been constructed, the layers can be clamped or compressed together to attain equilibrium. Preferably, all of the layers of the zinc-based battery have some flexibility, although it is envisioned to produce the zinc-based batteries with at least one layer that is substantially inflexible, as readily understood by the person skilled in the art. Preferably, all of the layers of the zinc-based batteries are made of nontoxic materials. In one embodiment, the zinc-based battery is substantially devoid of zinc triflate and cathode additives such as bismuth, titanium, and copper. The zinc-based batteries further comprise terminals, which can be created by cutting terminals into the flexible anodic and cathodic current collectors. Alternatively, terminals can be attached after equilibration of the zinc-based battery, e.g., by using a conductive solder paste such as silver.

It should be appreciated that the layers of the zinc-based batteries can be cut to size prior to layering and equilibration. Alternatively, large surface area layers can be used, followed by equilibration, and then the individual zinc-based batteries cut to size.

Accordingly, in a fourth aspect, a zinc-based battery is disclosed, said zinc-based battery comprising a first flexible current collector, a cathode ink layer, a substantially coated swollen gel electrolyte, a zinc layer, and a second flexible current collector, wherein the substantially coated swollen gel electrolyte comprises an amorphous solid structure comprising chitosan, PVA and KOH, with KOH solution in its pores, and a substantial coating of chitosan-based polymer gel electrolyte solution. Preferably, the cathode ink layer comprises electrolytic manganese dioxide (EMD). It should be appreciated that the chitosan-based polymer gel electrolyte and swollen gel electrolyte of the fourth aspect can correspond to that described in the second aspect, or can be some other chitosan-based polymer gel electrolyte or swollen gel electrolyte. The zinc-based battery of the fourth aspect can be manufactured using the method of the third aspect, or some other method using substantially similar materials and many of the same steps, as readily envisioned by the person skilled in the art. In one embodiment, the zinc-based battery is substantially devoid of zinc triflate and cathode additives such as bismuth, titanium, and copper. Advantageously, the Zn-based battery is highly rechargeable, which is made possible by limiting the oxidation potential to a range of about 0.4-1.2V resulting in a minimization of the possible formations of $\delta$-$MnO_2$.

In a preferred embodiment, the zinc-based battery of the fourth aspect has the module and power requirements of: voltage 1.5V-3.0V; specific capacity about 300 mAh/gm; cyclability of at least 300 cycles; energy density 150 Wh/Kg (wrt cathode); and an operating voltage of about 0.4-1.2V.

In a fifth aspect, at least two zinc-based batteries of the fourth aspect are arranged in series, having an insulating material layer such as polyethylene film, or the like, positioned between each distinct zinc-based battery of the fourth aspect. Preferably, the insulating material layer is flexible so that the overall zinc-based battery remains flexible. It is readily envisioned to have 2, 3, 4, 5, 6, 7, 8, 9, or 10 or more zinc-based batteries of the fourth aspect arranged in series.

The Zn-EMD battery described herein fabricated with the chitosan-based polymer gel electrolyte has several added advantages such as nonflammability, nontoxicity and no leakage issues due to the choice of materials for each of the layers making them inherently safe, in addition to being highly mechanically stable and rechargeable (e.g., at least 150 cycles, preferably at least 250 cycles, and most preferably at least 300 cycles) with high performance (energy density of at least 155 Wh $kg^{-1}$ and specific capacity of at least 300 mAh/g). Also, due to the use of flexible components (e.g., carbon cloth, flexible electrolyte, thin Zinc foil) when constructing the complete zinc-based battery, the complete battery is flexible and thus there are numerous potential storage applications in flexible and wearable electronics. Applications for the zinc-based batteries described herein include, but are not limited to, augmented reality glasses, fitness trackers, wireless headsets, smart watches, smart phones, jackets and vests with recyclable batteries, hats with recyclable batteries, socks with recyclable batteries, power banks, smart rings, location trackers, hearing and balancing aids, air/gas sensors, and wireless sensor networks.

Further, a scalable, energy and time efficient preparation method for developing high ionically conductive chitosan-based PVA-KOH polymer gel electrolytes has been described herein, with a best sample ({5}CPK0.3) having an ionic conductivity of 457.19 mS/cm. The results for conductivity obtained using the chitosan-based polymer gel electrolytes are comparable with other reported solid-state gel electrolytes, but also with conventional liquid or aqueous electrolytes. Extensive morphology and structural studies were conducted on these electrolytes to characterize the mechanical, electrochemical, and thermal efficiency of the films. In addition to achieving films with high ionic conductivity, the experiments evidence a material having high flexibility, strength, temperature stability, and cycle life. A unique technique was employed for assembling the Zn—

$MnO_2$ batteries described herein, using the best {5}CPK0.3 chitosan-based polymer gel electrolyte sample to obtain optimal interfacial electrode/electrolyte contact. Cell testing of the assembled Zn-EMD batteries described herein indicate the successful accommodation of the gel electrolytes in reversible redox reactions for at least 170 cycles, preferably at least 300 cycles. Also, a noteworthy specific capacity of 310 mAh/g using 200 mA/g charge/discharge current densities was obtained for the initial cycle during galvanostatic cycling, which later averaged to about 220 mAh/g for all 170 cycles with a coulombic efficiency of ~97% and highest energy density of 155 Wh/kg.

The features and advantages of the invention are more fully illustrated by the following non-limiting examples, wherein all parts and percentages are by weight, unless otherwise expressly stated.

Example 1

Experimental a. Preparation of Chitosan Based Gel Polymer Electrolyte

A stage-wise preparation technique similar to [29, 30] was adapted for electrolyte preparation. During the first stage, all polymers being used were made solution processable. Chitosan ($M_w$-1526.4 g/mol, Fischer Scientific) obtained in powder form was made solution processable by dissolving an appropriate amount (300 mg) in 10 ml of 1.5% acetic acid (Sigma Aldrich) solution on a magnetic stirring assisted hot plate at 70° C. and 220 rpm overnight. During the same stage, polyvinyl alcohol (PVA) (Mowiol, $M_w$-130,000, Sigma Aldrich) polymer crystals (600 mg) were dissolved in 10 ml deionized (DI) water and magnetically stirred at 200 rpm on a hot plate at 75° C. overnight. In the second stage, varying amounts of PVA (0.2, 0.4, 0.6, 0.8 and 1) were added to the chitosan solution to obtain Chitosan-PVA (CPx) mixtures, where x indicates the amount of PVA added to obtain 1: x wt. ratio of chitosan:PVA mixture. The obtained samples are mixed using a vortex mixer for a few minutes to create a homogeneous solution. The various obtained samples were then drop-casted into silicon molds (2 cm diameter) for ease of extraction. The molds with the mixture were then placed in an oven for drying at 37° C. for 20 hours. The schematic shown in FIG. 1A summarizes an electrolyte preparation process. Dried gel electrolytes were then removed, soaked and then measured. Conductivity, structural, physical, and electrochemical stability studies were performed on the prepared Chitosan-PVA samples.

In the third stage, the best performing electrolyte CP0.2 (Chitosan:PVA=1:0.2) was chosen based on ionic conductivity values and stability following stage two. To this dried gel CP0.2 electrolyte, varying amounts of different molar concentrations of KOH (Sigma Aldrich) were added to form {Z}CPKy solutions individually (where Z=molar concentration, 2/3/4/5/6/7/8M, of KOH and CPKy corresponds to the weight ratio of CP0.2:y, wherein y indicates the amount of KOH added (from 0.1 to 0.5) to obtain 1: y wt. ratio of CP0.2:KOH mixture). The obtained new mixtures were mixed, drop-casted, and dried in the same way as stage two. These obtained films were initially weighed (W1) and then soaked in their respective molar concentration {Z} solutions for intervals of 15 mins until 1 hour and thereafter for intervals of 60 mins until 3 hours. The final weights (W2) of each of the samples at each of the defined intervals were measured. The resulting swollen films were then tested for ionic conductivities. The best performing electrolyte was found to be {5}CPK0.3 (5M KOH, CP0.2:KOH=1:0.3) due to its superior ionic conductivity value. Conductivity, Structural, Physical, and Electrochemical stability studies were performed on the prepared Chitosan-PVA-KOH electrolytes.

b. Cathode Ink Preparation

EMD (EAB 111, Prince Int. Corp.) in powder form was used as the active material in cathode preparation. Other materials needed included Ketjenblack (conducting agent, EC-600J, Nouryon), chitosan solution (e.g., from stage 1 of part (a)), a minuscule amount (~2%) of W-28 (dispersing agent to prevent agglomeration, Nuosperse, Elementis), and DI water (solvent). A homogeneous conducting EMD cathode ink with 70:20:10 weight ratios of EMD powder, Ketjenblack, and chitosan solution was prepared in a high energy ball milling machine (MTI corp.) at 35 Hz for 30 minutes. A suitable amount of DI water was put in as a solvent to attain a desired, workable viscosity of the ink A minute amount of W-28 (~2%), a dispersing agent, was added to the solution to prevent agglomerations. The final solution mixture obtained from the ball mill was used as the EMD cathode ink for battery preparation c. Cell Assembly Using the best electrolyte sample ({5}CPK0.3) from (a), prepared EMD cathode ink from (b), and a commercially available zinc anode foil (rolled, 99.95%, 30 μm, Good fellow), a complete cell was constructed as shown schematically in FIG. 1B. A flexible carbon cloth (Spectracarb 2225ACF, GINER ELX Inc.) (CC) was chosen to be used as both an anodic and cathodic current collector. Prior to its use in cell assembly, the CC was activated by refluxing in 3 M HNO$_3$ solution (Fischer Scientific) at 80° C. for 12 h. The activated CC was then washed step-wise with acetone, ethanol, and DI water with sonication for 30 minutes each and then dried at 80° C. This acid-treated CC was then used in the cell assembly. The homogeneous EMD cathode ink was coated on the activated CC by a doctor blade and dried at 110° C. for 12 hours. The loading of the active cathode materials was ~1.4 mg/cm$^2$. The prepared stable, free-standing {5}CPK0.3 electrolyte (can be seen in FIG. 4A) was then dipped in the same {5}CPK0.3 electrolyte solution to attain an even gooey coat on all its sides and placed on the cathode. This non-conventional step of coating was employed to attain better contact of electrolyte and cathode, thereby reducing the possibilities of interfacial resistance. On top of the electrolyte, a zinc foil was positioned followed by the placement of another activated CC on the zinc foil. The obtained cell comprising the five layers—activated CC, EMD coating, coated electrolyte, zinc foil, and activated CC, as can be seen from the schematic in FIG. 1B, were clamped together for at least 120 minutes to attain equilibrium. This equilibrated full battery was used for charge discharge galvanostatic testing.

d. Characterizations and Measurements

AC electrochemical impedance spectroscopy (EIS) was used to investigate ionic conductivities of samples at room temperature using a Versastat (Princeton applied research) from 1 MHz to 100 mHz at an amplitude of 10 mV. At least four samples of each of the compositions of electrolytes (CPx, CPKy) were made and measured to minimize the error margin. The set-up used was created in-house and is similar to a Swagelok cell, with electrolyte sandwiched between custom-built stainless steel (SS) blocking electrodes with a geometric surface of ~2.5 cm$^2$. The thickness of the samples was measured using a Vernier caliper (Mityutoyo) prior to any impedance measurements, which was calculated as the difference of measured lengths of blocking electrodes with and without the electrolyte between them. These measurements were also later confirmed using a micrometer (Mityutoyo) to minimize any possible error. All microscopic imaging was performed using a beam reflecting and transmitting microscope (BX53M, Olympus) coupled with stream basic software for data processing of varied scans. The Fourier transform infrared (FT-IR) absorption spectra of various gel electrolytes were measured using a Frontier Optica spectroscope from Pelkin Elmer with a resolution of 2 cm$^{-1}$, 400-4000 cm$^{-1}$ measuring wave number and 64 scans. Thermogravimetric analysis (TGA) of samples was conducted using a Perkin Elmer Pyris 1 thermogravimetric analyzer. The temperature range used for testing was 25-800° C. with the temperature increasing at the rate of 10° C./min with He flow within the furnace. Linear scan voltammetry (LSV) with potential range 0-4V at 5 mV/s and charge-discharge testing of the assembled cells were conducted using the earlier mentioned Versastat.

Results and Discussion a. Impedance Studies

The room temperature ionic conductivities of all samples with varying ratios in varied molar concentrations are obtained through AC impedance measurements using Nyquist plots. A blocking electrode system, SS/Chitosan-based electrolyte/SS was used for the studies. Although the data is not shown here, 118.82-287.58Ω, and 1.06-11.64Ω, were the ranges of bulk resistance (R$_b$) for CPx and {2}CPKy samples, respectively.

The highest ionic conductivity recorded for the Chitosan-PVA system was 6.95 mS/cm for CP0.2 (chitosan:PVA=1: 0.2) sample. This sample was chosen for further experimentation due to its relatively high ionic conductivity value with similar flexibility, and stability as the other films. In an effort to further improve the ionic conductivity values, varying amounts of different molar concentrations of KOH were added to the CP0.2 sample to prepare the {Z}CPKy films as discussed in the experimental section.

Figure 2A:
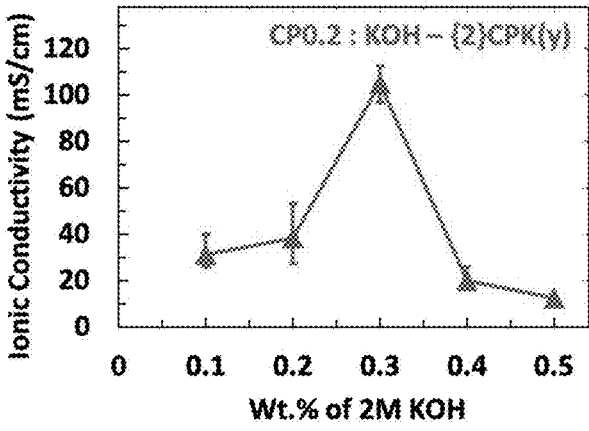
FIG. 2A shows the ionic conductivity trend with different amounts of 2M KOH added to a CP0.2 sample.
Figure 2B:
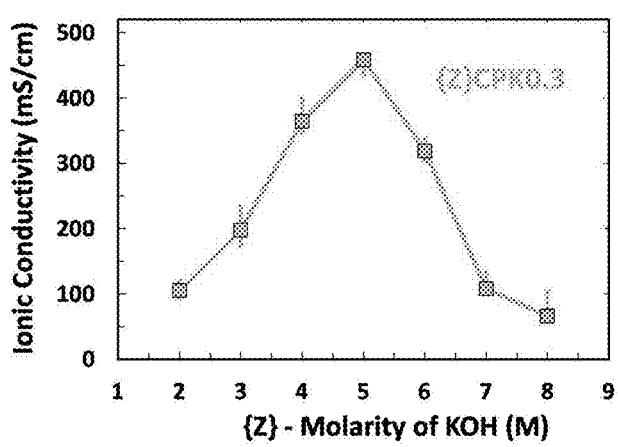
FIG. 2B shows the individual best ionic conductivities as a function of the molar concentration of KOH solutions used in making {Z}CPK0.3 samples.
Figure 2C:
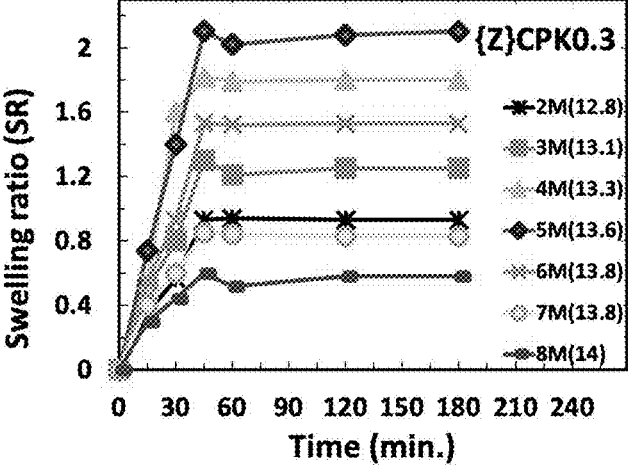
FIG. 2C shows the swelling ratios of soaked {Z}CPK0.3 samples in varied KOH solutions with (pH value) for different intervals of time.

FIG. 2A shows the ionic conductivities of {2}CPKy samples; i.e., CP0.2 sample with varying amounts of 2M KOH. When observing the effect of adding varied amounts of 2M KOH, it was observed that the ionic conductivities increased with increasing salt content until 30 wt. % (1:0.3 ratio). These increased conductivity values may be due to the increase in the number of mobile ions in the polymer gel, which are generated due to the dissociation of the added KOH salt [53]. Also, within this salt content range (i.e., 30 wt. %), the rate of ion dissociation is greater than the rate of ion association due to the increased conductivity values. The sample {2}CPK0.3 recorded the highest ionic conductivity value of 105.04 mS/cm. Beyond this 30 wt. % (0.3 ratio) 2M KOH salt addition, the ionic conductivity values decreased. This phenomenon of increasing conductivity until 30 wt. % salt content addition followed by a reduction was similar for all {Z=3/4/5/6/7/8}M KOH added samples. Accordingly, it was concluded that the {Z}CPK0.3 sample was the best within the {Z}CPKy system. The individual best ionic conductivities from each of the varied KOH M concentration systems are compared against each other as seen in FIG. 2B. The ionic conductivity values increased with increased KOH concentration until 5M KOH and then reduced beyond for higher KOH concentrations. A highest ionic conductivity of 457.19 mS/cm was recorded for {5}CPK0.3 sample. This high ionic conductivity obtained is comparable to best reported polymer electrolyte systems as can be observed in table 1. Without being bound by theory, the increase in conductivity until 5M KOH may be due to the increase in the number of mobile OH$^-$ ions and reduction beyond 5M due to aggregation of excess ions. This trend of increasing values until 5M KOH and then reducing beyond is also similar to the trend of SR ratios obtained for varied samples (see, FIG. 2C). Therefore, it is assumed that the increase in ionic conductivities until 5M is a result of higher swelling ratio and is in agreement with previously reported studies.

chitosan spectra shows peaks around 3421 to 3300 cm$^{-1}$ that represents a strong O—H bond and its axial stretch due to the presence of an alcohol group [56, 57]. The peak around 2926 cm$^{-1}$ indicates medium C—H stretch in alkanes, and the peak at 1687 cm$^{-1}$ indicates medium N—H stretch bend due to the amine group of chitosan [56]. Peaks around 1442

TABLE 1

| Ionic conductivity values of various polymer electrolyte compositions used in various applications. | | | | | |
|---|---|---|---|---|---|
| Polymer electrolyte composition | $\sigma_i$ (mS/cm) | Ref. # | Polymer electrolyte composition | $\sigma_i$ (mS/cm) | Ref. # |
| PEO—KOH | 1 | [12, 21] | PVA—KOH—H$_2$O | 1 | [19] |
| PVA—KOH | 0.85 | [15] | GGPE (gelatin-based polymer gel electrolyte) | 3.1 | [17] |
| PVA—PEO-glass fiber mat-KOH | 10 | [11] | PVA-Chitosan-NH$_4$Br | 0.768 | [34] |
| PVDF—PC—EC—ZnTf | 3.94 | [22] | Chitosan acetate-NH$_4$CH$_3$COO—EC | 3.83 | [35] |
| PAN—PC—EC—ZnTf | 2.67 | [23] | Plasticized chitosan-PEO—NH4NO3—EC | 2.06 | [38] |
| PVA—PAA—KOH | 300 | [18] | PVA-Plasticized chitosan-NH$_4$NO$_3$ | 1.6 | [39, 53] |
| PVA—KOH—PEGDE | 220 | [24] | PVA-Bamboo charcoal-KOH | 66.3 | [54] |
| PEG—PVA—(NH$_4$CH$_2$CO$_2$)$_2$ | 3.7 | [13] | Chitosan-adipic acid | ~4 | [40] |
| PVA—KOH hydrogel | 340 | [25] | Chitosan-acetic acid | ~2.5 | |
| Gelatin-PAM | 26.5 | [26] | NFC hydrogel-gelatin-KOH | 90 | [29] |
| Gelatin-PAM—PAN | 17.6 | | NFC hydrogel-PVA—KOH | 75 | [30] |
| Chitosan-PVA—KOH | 457.19 | Present work | | | | b. Structural Studies

Figures 3A, 3B, 3C, 3D, 3E:
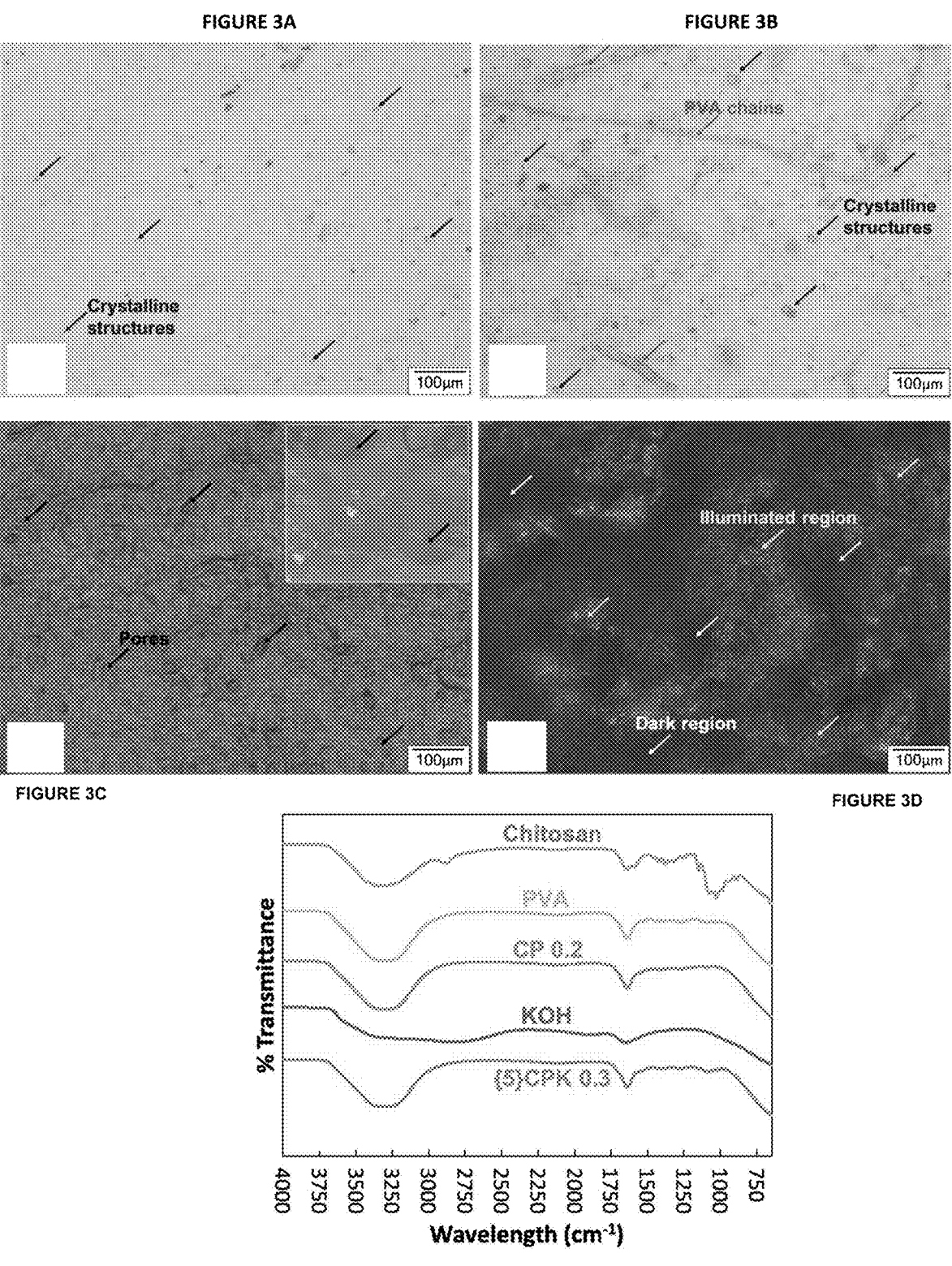
FIG. 3A shows the reflected beam optical micrograph of pristine chitosan.
FIG. 3B shows the reflected beam optical micrograph of chitosan with PVA (CP0.2).
FIG. 3C shows the reflected beam optical micrograph of CP0.2 with 5M KOH ({5}CPK0.3).
FIG. 3D shows the transmitting beam optical micrograph of {51}CPK0.3.
FIG. 3E shows the FTIR spectra of pristine chitosan, PVA, KOH, CP0.2 and {5}CPK0.3.

Microscopic imaging and FTIR analysis were performed on the pristine and best samples (CP0.2 and {5}CPK0.3) at each of the stages of the electrolyte to understand enhanced conductivities better in relation to the morphological and structural bond changes occurring in the films. FIGS. 3A, 3B and 3C show the reflected beam micrographs of pristine chitosan, 20 wt. % PVA added chitosan (CP0.2), and 30 wt. % 5M KOH added Chitosan-PVA ({5}CPK0.3), respectively. The micrograph of the pure chitosan film (FIG. 3A) suggests that the surface of the film is smooth and homogeneous except for evenly wide-spread tiny crystalline structures. These may be the major reason for the low ionic conductivity values of pristine chitosan films [55]. FIG. 3B, the micrograph of CP0.2 (best CPx sample), shows that the surface is still uniform throughout but with additional PVA chains. The obtained concatenated image shows and confirms the presence of chitosan crystals, PVA chains, and the solution trapped in between. This retention of amorphous nature of the gel electrolyte due to PVA explains the increased conductivity values [21, 22, 29, 42]. With the addition of 30 wt. % KOH to CP0.2, the surface of the gel sample ({5}CPK0.3) appears similar to a sponge, i.e., pores distributed on the surface of the membranes with KOH in between as can be seen in FIG. 3C. To confirm pores a higher magnification micrograph was also collected and is inserted in FIG. 3C.

The transmitting beam micrograph (FIG. 3D) of the {5}CPK0.3 sample shows an illuminated region, where light passes through the polymer network indicating the film to be porous inside as well, confirming the formation of 3D network. This allows more KOH to be retained within the polymer framework, thus providing more ions and as a result increased conductivity [53-55].

FIG. 3E shows the FTIR spectra of pristine chitosan, CP0.2, and {5}CPK0.3. This study was performed to confirm the restructuring of bonds due to the addition of additives to pure chitosan. Spectral analysis was performed on each of the solutions, i.e., the solution-processed chitosan, CP0.2 solution and {5}CPK0.3 solution from their respective stages in electrolyte preparation. Analysis of the cm$^{-1}$ and 1480 cm$^{-1}$ indicate the C—H stretching of CH$_2$ and CH$_3$ groups. The small tiny peaks around 1296 cm$^{-1}$ are due to the strong C—N stretch present in amines. Single peaks at 1158 cm$^{-1}$, 1061 cm$^{-1}$ and the simultaneous four peaks between 912 cm$^{-1}$ and 1023 cm$^{-1}$ are due to strong C—O—C stretching. Similarly, analysis of pure PVA and KOH were also performed. PVA spectra exhibited peaks at 3438 cm$^{-1}$, 2923 cm$^{-1}$, 1726 cm$^{-1}$, and 1656 cm$^{-1}$, indicating stretching of C—H, C=O, and C=C hydroxyl groups and were in agreement with previous studies [29, 30]. KOH spectra indicated stretched O—H bonds with a broad peak at ~3410 cm$^{-1}$ and also agrees with earlier studies [29, 30]. Addition of 20 wt. % PVA (0.2 ratio) to chitosan resulted in relaxing of most stretches observed in pristine polymers, thus confirming definite changes in bonds. Further, the addition of 30 wt. % KOH (0.3 ratio) to CP0.2 indicated re-emergence of few characteristic peaks between 1023 cm$^{-1}$ and 1158 cm$^{-1}$. Small disturbances in between the characteristic peaks indicating vibrations [21, 22, 55-57] in bonds were observed. Overall, the FTIR spectra results are indicative of changes in all the samples pertaining to the effect of different additives.

c. Stability Studies

Figure 4A:
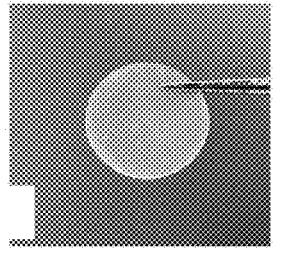
FIG. 4A shows an image of {5}CPK0.3 sample before the manual bending test.
Figure 4A:
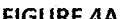
Figure 4B:
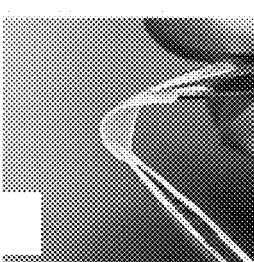
FIG. 4B shows an image of {5}CPK0.3 sample during the manual bending test.
Figure 4C:
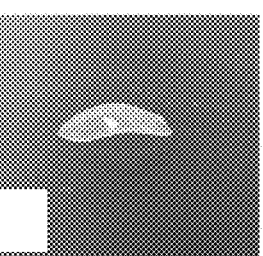
FIG. 4C shows an image of {5}CPK0.3 sample after 250 cycles of the manual bending test.

Various stability tests were performed on the prepared electrolytes. The strength, flexibility, and stability of the best-prepared gel electrolyte, i.e., {5}CPK0.3, was tested through a manual cyclic bending test. FIGS. 4A, 4B and 4C show the sample before, during and after testing, respectively. The sample was manually bent as shown in FIG. 4B for 250 cycles continuously. No cracks or ruptures of the sample were observed after completion of the test. This indicated that the sample was strong and flexible. But after complete bending cycles, slight plastic deformation of the sample was observed as can be seen in FIG. 4C.

TGA analysis (not shown) confirmed that the polymer electrolyte { 5}CPK0.3 is completely safe to be used in room temperature operating batteries and is stable under 50° C.

Figure 4D:
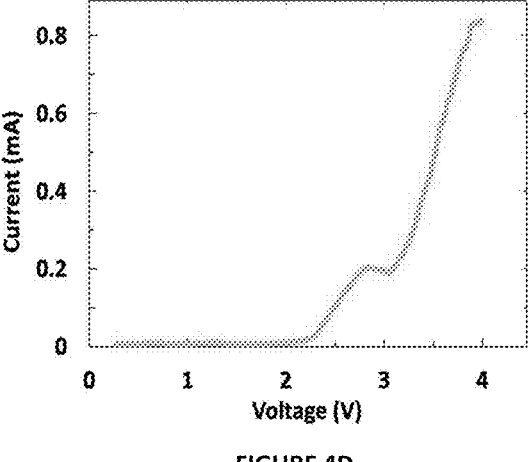
FIG. 4D shows the linear scan voltammogram for {5}CPK0.3 sample at sweep rate of 5 mV/s.

The best sample {5}CPK0.3 was also tested using a linear scan voltammetry experiment (LSV). It was performed to determine the potential range for its electrochemical stability. To perform LSV, the electrolyte was placed between zinc and stainless-steel electrodes. The anodic stability of the electrolyte was determined by applying a sweeping voltage until 4V at a scan rate of 5 mV/s followed by monitoring of the resulting current density values. FIG. 4D shows the resultant voltammogram. Analysis of the voltammogram indicates that the sample {5}CPK0.3 showed negligible current densities between 0 and 2V, with respect to the zinc electrode. Beyond that, an increase in currents is observed, thereby indicating changes occurring in the electrolyte. Thus, the prepared CPK0.3 gel electrolyte can provide the necessary electrochemical stability for a battery operating under 2V. Overall, the prepared biodegradable chitosan-based alkaline polymer electrolyte with excellent ionic conductivity, flexibility, and stability is among the best reported.

d. Cell Fabrication and Testing

A Zinc-EMD battery with the prepared {5}CPK0.3 gel electrolyte was assembled in steps following the process described in the experimental section (and illustrated in FIG. 2B). These prepared cells were then tested at room temperature in ambient conditions. Cell testing was performed using a two-electrode setup in which EMD ($\gamma$-MnO$_2$) was chosen as the working electrode and zinc foil was chosen as the counter and reference electrode. The assembled cell was made to undergo a typical galvanostatic cycling test at the charge and discharge current densities of 200 mA/g and its performance is shown in FIG. 5. A protocol of constant-current discharge until 0.2V followed by rest for 120 seconds before the constant-current charge up to 1.2 V was followed for the galvanostatic charge-discharge (GCD) test. The lower limit of 0.2 V was chosen because EMD is known to undergo a two-step reduction process, the initial proton insertion reaction approximately between 0.8-1 V (vs. Zn) and the second dissolution-precipitation reaction between 0.3-0.5 V, wherein when utilized together, higher capacities are used as additives to EMD during cathode preparation [43, 46, 48, 50]. Thus, a non-conventional approach of GCD testing by limiting the voltage at 1.2 V during the charge cycle is adapted hoping to achieve high reversibility for a Zn-EMD battery with no additives by hindering any possible formations of the irreversible $\delta$-MnO$_2$ during the process. Hence, the charge-discharge voltages were limited between 0.2 and 1.2 V were used for the GCD analysis.

Figures 5A, 5B, 5C, 5D:
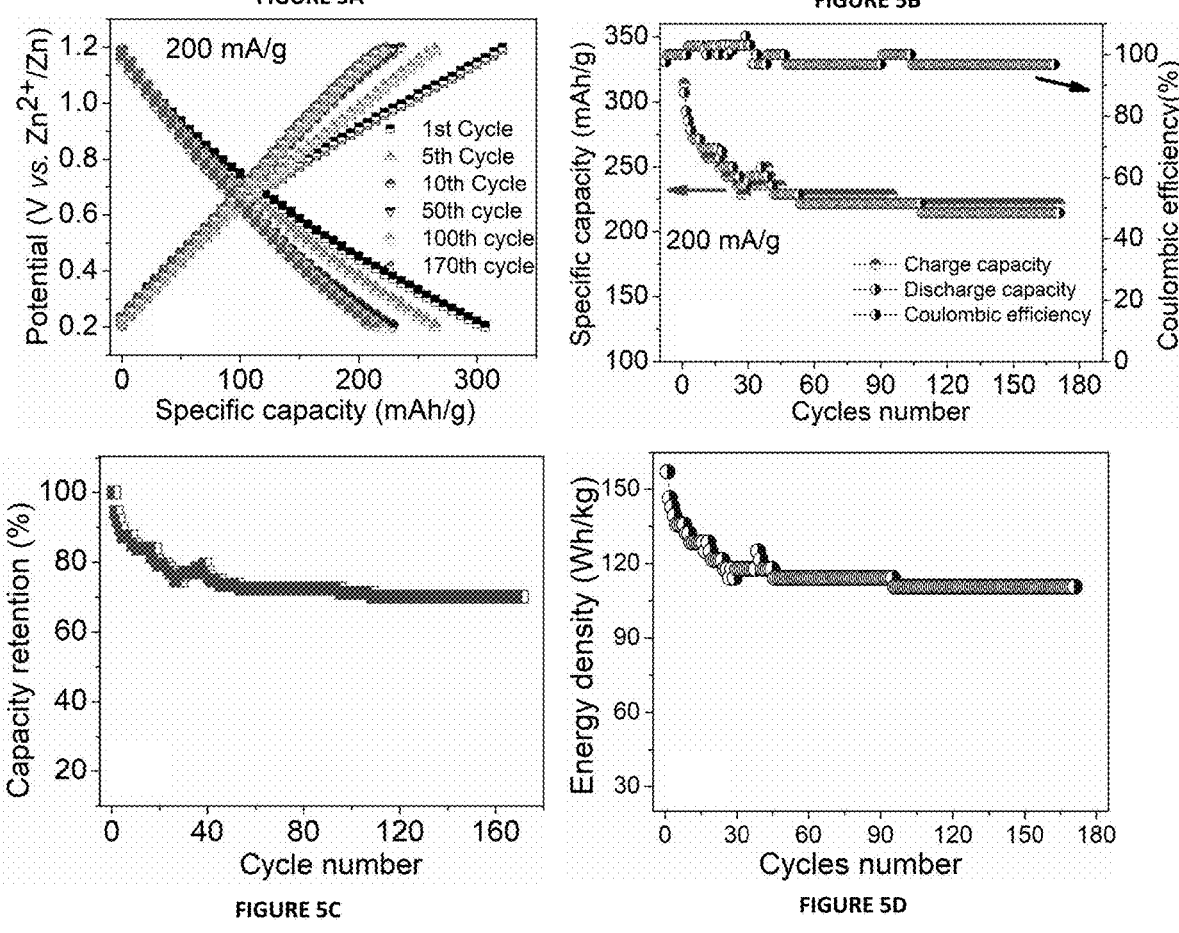
FIG. 5A shows the charge-discharge profiles for different cycle numbers at charge/discharge current density of 200 mA/g.
FIG. 5B shows the galvanostatic cycle life data for the assembled cell cycled at 200 mA/g.
FIG. 5C shows the percentage capacity retention curve with respect to initial cycle for all 170 cycles.
FIG. 5D shows the average energy density versus the cycle number graph for a Zn/EMD cell over 170 cycles.

GCD test results indicated the average capacities for cycles 1, 5, 10, 30, 50, 100 and 170 obtained from the charge and discharge capacities for each of the cycles to be 310 mAh/g, 271 mAh/g, 264 mAh/g, 238 mAh/g, 228 mAh/g, 221 mAh/g and 214 mAh/g, respectively. FIG. 5A and Table 2 show more details of individual charge and discharge capacities for each of the few selected cycles. FIG. 5B shows the cycling capability of the cell obtained from the GCD tests conducted on the Zn-EMD cell with {5}CPK0.3 electrolyte over 170 cycles. Remarkably, a highest average specific capacity of 310 mAh/g was obtained for the initial cycle at 200 mA/g, which indicates an approximate 50% utilization of the theoretical capacity (617 mAh/g) of MnO$_2$ undergoing a two-step reduction reaction mechanism. Thereafter, a rapid loss of the initial capacity was observed up to 30 cycles. Overall, these observed losses in capacity during initial cycles are a typical characteristic of Zn—MnO$_2$ alkaline batteries [46, 60]. The rate of loss of capacity after 30 cycles was comparably low and stabilizes to approximately 214 mAh/g by the end of the 170$^{th}$ cycle. The coulombic efficiency (CE) of the cell over 170 cycles was plotted using the values obtained using the relation: CE (%)=(Cd/Ce)×100 for each of the cycles, where Cd is the discharge capacity and Ce is the charge capacity. As can be observed from FIG. 5B, a coulombic efficiency of ~97% was obtained.

TABLE 2

Summary of cycles 1, 5, 10, 30, 50, 100 170 obtained from the galvanic charge-discharge (GCD) studies of the prepared Zn/EMD cell.

| Cycle Number | Charge Curve | | | Discharge Curve | | | Coulombic efficiency | Average Energy Density (Wh/Kg) | Capacity Retention (w.r.t. initial cycle) |
| | Current Density | Capacity (mAh/g) | Max. Voltage (V) | Current Denstiy | Capacity (mAh/g) | Min. Voltage (V) | | | |
|---|---|---|---|---|---|---|---|---|---|
| 1 | 200 mA/g | 314.28 | 1.2 | 200 mA/g | 307.14 | 0.2 | 97.73 | 155 | — |
| 5 | | 271.43 | | | 271.43 | | 100 | 136 | 87.36% |
| 10 | | 264.29 | | | 264.29 | | 100 | 132 | 85.06% |
| 30 | | 236.71 | | | 239.29 | | 101 | 119 | 76.44% |
| 50 | | 228.57 | | | 228.57 | | 100 | 114 | 73.56% |
| 100 | | 221.43 | | | 221.43 | | 100 | 111 | 71.26% |
| 170 | | 221.43 | | | 214.29 | | 96.77 | 111 | 70.11% | are obtained [43-46, 48, 50, 60]. The higher limit 1.2 V was chosen because at this voltage the dominant oxidation reaction in the anodic direction responsible for bringing MnO$_2$ back to its original Mn$^{4+}$ form occurs [43, 50]. Conventionally oxidation in anodic direction is continued until 1.8 V during cyclic testing of Zn/EMD chemistries, to be able to utilize the additional capacities generated due to the gradual $\delta$-MnO$_2$ peak formations around 1.5 V resulting from the occurrences of polymorphic changes in $\gamma$-MnO$_2$ with increasing cycles [43, 48, 50]. The $\delta$-MnO$_2$ formations occurring during these cyclic tests often are highly irreversible and unfit for further use due to their disturbed tunnel structure and thus, mainly responsible for the rapid capacity decay in Zn-EMD batteries unless Cu, Bi, Ti, or their oxides On comparison of the capacities of cycle 1 and cycle 5, it is observed that there is a 12.58% reduction in capacity. Similarly, there was about 14.84%, 23.56%, 26.45%, 28.71% and 30.97% capacity reductions for cycles 10, 30, 50, 100 and 170, respectively, in comparison to the initial cycle. FIG. 5C indicates these reductions in capacity in terms of retention capacity with respect to the initial cycle for all 170 cycles. Though an evident reduction in capacities was observed, no rapid rise/fall in end voltages (charge, discharge) between consecutive cycles was observed as can be seen from Table 2. Thus suggests no occurrence of any concentration polarization at the electrode surfaces and also no passivation of zinc electrodes within the voltage window chosen for cyclic testing [46, 61]. Without being bound by theory, it is assumed that this is due to the higher amounts of charge carriers, i.e., the $OH^-$ ions (alkaline system), available in the polymer electrolyte close to the electrode surface [60, 61, 62]. In addition, the voltage-charge and voltage-discharge curves for each of the cycles have a slope like behavior, as in FIG. 5A, which we assume is because there are no polymorphic structural changes happening to $MnO_2$ due to the limited voltage window chosen for the GCD testing. This slope-like behavior is characteristic of a supercapacitor that represents a dominant pseudocapacitive possessing a stable, reversible structure for long cycles [23, 60, 62, 64, 65]. It is known that the low cyclability of pure $Zn$—$MnO_2$ alkaline batteries is due to the proton insertion and dissolution-precipitation reactions associated with alkaline batteries, which results in the formation of irreversible $\delta$-$MnO_2$ with cycles [46, 50, 66]. Advantageously, the high rechargeability of the Zn-EMD battery described herein was made possible by limiting the oxidation potential to a range of about 0.4-1.2V resulting in hindering of the possible formations of $\delta$-$MnO_2$.

TABLE 3

| | | | | | | |
|---|---|---|---|---|---|---|
| | | Details of specific capacity and cycle numbers of varied Zinc anode-based battery chemistries chosen for comparison. | | | | |
| | Cathode | Electrolyte | Gel (G)/ Liquid(L) | Capacity//number of cycles | Ref. # |
| Acidic | $MnO_2$ | PVDF—HFP—IL—$Zn(OTf)_2$—NMP | G | 85 mAh/g// | [64] |
| | EMD | PAN—PC—EC—ZnTf | G | 100 mAh/g//70 cycles | [23] |
| | ZnHCF/$MnO_2$ nanosheets | PVA—$ZnSO_4$ | G | 118 mAh/g//1000 cycles | [62] |
| | EMD + $CeO_2$ | 1M LiOH—$ZnSO_4$ | L | 200 mAh/g//10 cycles | [65] |
| | EMD | 3M $Zn(TFSI)_2$—0.1M $Mn(TFSI)_2$ | L | 90 mAh/g//6000 cycles | [60] |
| Alkaline | EMD | PVA-Chitosan-KOH | G | 310 mAh/g//170 cycles | Present work |
| | $\beta$-$MnO_2$ | 3M LiOH—1M KOH | L | 225 mAh/g//100 cycles | [66] |
| | $\beta$-$MnO_2$ + $Bi_2O_2$ | 3M LiO—1M KOH | L | 316 mAh/g//100 cycles | |
| | EMD | KOH | L | ~30 mAh/g//30 cycles | [50] |
| | EMD + $Bi_2O_3$ + Cu. | KOH | L | ~600 mAh/g//200 cycles | | controlled process, which generally is indicative that the redox reactions primarily occur between the electrode and the electrolyte surfaces and thus allows achieving fast kinetics with good high-rate performance [46, 60, 62, 63]. Without being bound by theory, it is assumed that this pseudocapacitive controlled process, along with the intentional $\delta$-$MnO_2$ formation hindrances provided by limiting the voltages for GCD testing, led to the achievement of a high capacity for the prepared Zn-EMD alkaline battery along with rechargeability and considerably good retention of capacity over 170 cycles.

A comparison study with few of the existing Zn-based batteries was conducted to better understand the performance level of the battery described herein relative to the prior art batteries. Table 3 provides details of specific capacity, charge and discharge cycles of different cathode materials and various gel/liquid electrolytes for the Zn-based batteries chosen for comparison. It was observed that the maximum specific capacity (310 mAh/g) recorded for the Zn-EMD battery described herein is higher when compared to other Zn-based acidic/alkaline chemistries with pure cathode materials (only $MnO_2$ polymorphs) [23, 50, 60, 64] and is similar to chemistries with additive-based cathode materials ($MnO_2$ polymorph+Ce/Cu/Bi based) [62, 65, 66]. As previously described, it is assumed that the higher specific capacity values achieved for pure cathode material was due to the pseudocapacitive nature of reactions as well as the availability of large number of charge carriers ($OH^-$ ions) in the gel electrolyte during the cycling process. When comparing the rechargeability of the Zn-EMD battery described herein (170 cycles), it was observed that it had lower number of cycles in comparison to acidic batteries generally and had similar or higher cyclability when compared to alkaline batteries with or without additives, respectively. This phenomenon of high cyclability associated with pure or additive $Zn$—$MnO_2$ acidic batteries might be due to the intercalation/deintercalation diffusion and complexation mechanism associated with them, thus resulting in them In addition to capacity and cyclability, the average energy density for each cycle performed on the Zn-EMD battery describe herein were calculated based on the active mass of cathode as shown in FIG. 5D. In the first cycle a high specific energy density of 155 Wh/kg was observed, after which there was a gradual reduction in the energy density values until a stable value of about 111 Wh/kg for 170 cycles was attained. Moreover, these maximum energy densities obtained were comparable to other existing similar energy storage devices made from acidic electrolyte $VS_2$/Zn (118 Wh/ kg/$ZnSO_4$) [based on mass of the cathode] [67].

e. Performance and Reversibility

Figures 6A, 6B, 6C, 6D, 6E, 6F:
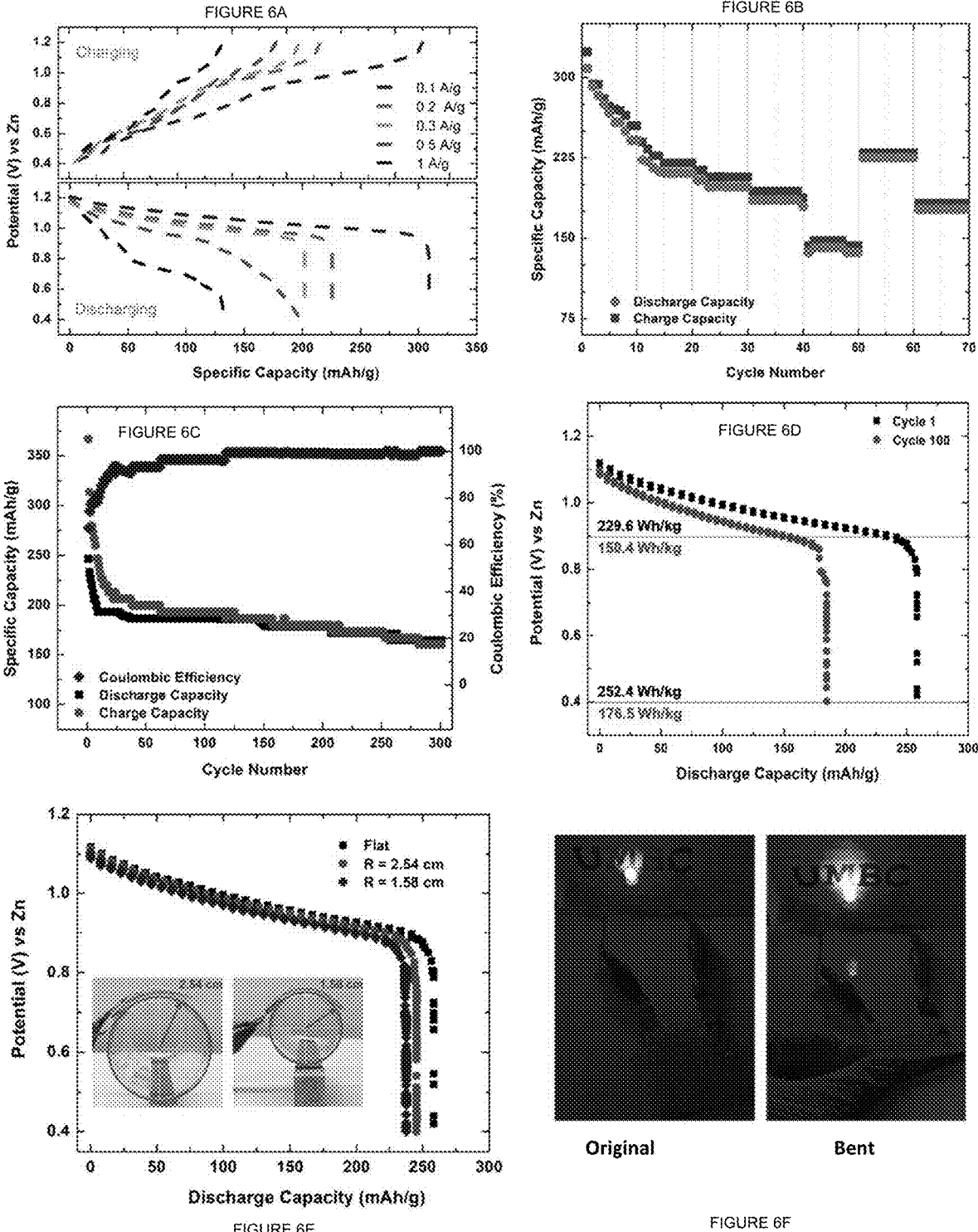
FIG. 6A illustrates the charge—discharge profiles of the assembled cells run at different current densities.
FIG. 6B illustrates the rate capability of the Zn-EMD cell with the chitosan-alkaline electrolyte cycled between 0.4 and 1.2 V.
FIG. 6C illustrates the cycling performance at 0.5 A/g.
FIG. 6D illustrates the discharge curves for cycles 1 and 100 until 0.4 V at 0.5 A/g with energy density (w.r.t. cathode mass) shown.
FIG. 6E illustrates initial bending performance of the assembled large cell in different bending conditions.
FIG. 6F shows photographs of an LED bulb powered by a flexible Zn-EMD battery in the original and bent states.

To examine the performance and extent of reversibility achievable for a Zn-EMD alkaline battery without any electrode additives, further electrochemical tests were conducted in the voltage region of 0.4-1.2 V. The Zn-EMD cell demonstrates good rate performance, as shown in FIGS. 6A-B. The average discharge capacities were 287.6, 217.2, 200.24, 188.4, and 132.6 mAh/g, respectively, at 0.1, 0.2, 0.3, 0.5, and 1 A/g current densities. Moreover, when the rate was switched back to 0.1 and 0.5 A/g, discharge capacities of 225 and 178 mAh/g, respectively, were recovered, revealing reasonably good structural stability and a considerable tolerance to rapid $Zn^{2+}$ complexations [5]. FIG. 6C shows the cycling capability of the cell obtained from the 0.4-1.2V range GCD test conducted at a 0.5 A/g current density over 300 cycles. A highest average specific capacity of 248.5 mAh/g was recorded, after which rapid loss in capacity values was observed. The rate of loss in capacity values after 60 cycles was comparably low and stabilizes to an average capacity of 175 mAh/g over 300 cycles. FIG. 6C also shows the 96.5% Coulombic efficiency obtained. Discharge curves for cycles 1 and 100 at 0.5 A/g are also shown in FIG. 6D. The discharge plateaus can easily be discerned from the curves and are also in accordance with the reduction peak of the CV curve. When analyzing the curves, it was observed that most of the capacity obtained was over 0.9 V potential. Energy densities of 150.4-252.4 Wh/kg (calculated w.r.t. mass of the cathode) are achievable for these systems.

17

18

Figure 7A:
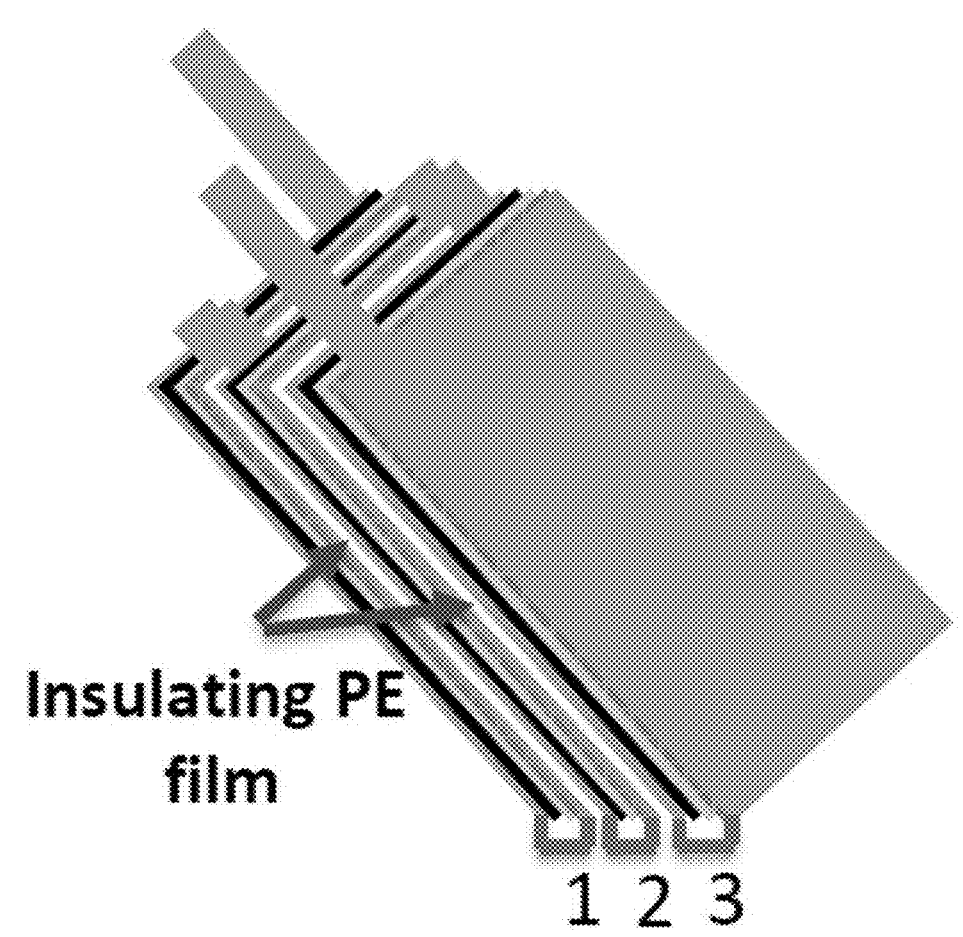
FIG. 7 is a schematic of three Zn-EMD batteries arranged in series with insulating polyethylene film positioned between each battery.

Furthermore, the assembled cell was also tested for performance under different bending conditions by mounting and securing the assembled flexible large cell in such a way that it is bent at a particular radius under the galvanostatic charge—discharge testing conducted at a 1 A/g current density. As can be seen from FIG. 6E, the discharge curves obtained for different bending radii almost overlap with the initial flat state, thus indicating robust performance of the cell even under deformation without substantial capacity deteriorations. This indicates good performance stability of the cell even when physically bent. Moreover, the battery constructed by using three cells in series successfully powered an LED bulb when flat and bent, as can be observed from FIG. 6F. A schematic of the three cells in series is shown in FIG. 7. Thus, the assembled Zn-EMD with the devised novel highly ionically conducting chitosan-based alkaline polymer electrolyte demonstrates its promising potential in personalized wearable electronics. The high reversibility recorded for these prepared Zn-EMD alkaline chemistries with polymer electrolytes and no cathode additives is one of the first reported. The results obtained are also comparable to the Zn-EMD cells with aqueous alkaline media and cathode additives.

Although the invention has been variously disclosed herein with reference to illustrative embodiments and features, it will be appreciated that the embodiments and features described hereinabove are not intended to limit the invention, and that other variations, modifications and other embodiments will suggest themselves to those of ordinary skill in the art, based on the disclosure herein. The invention therefore is to be broadly construed, as encompassing all such variations, modifications and alternative embodiments within the spirit and scope of the claims hereafter set forth.

REFERENCES

1. Dunn, B., Kamath, H., & Tarascon, J. M., 2011. Electrical energy storage for the grid: a battery of choices. *Science,* 334(6058), 928-935. http://doi.org/10.1126/ science.1212741.
2. Larcher, D., & Tarascon, J. M., 2015. Towards greener and more sustainable batteries for electrical energy storage. *Nature chemistry,* 7(1), 19. http://doi.org/10.1038/ nchem.2085.
3. Wanger, T. C., 2011. The Lithium future-resources, recycling, and the environment. *Conservation Letters,* 4(3), 202-206. http://doi.org/10.1111/ j.1755-263X.2011.00166. x.
4. Jacoby, M., 2013. Assessing the safety of lithium-ion batteries. *Chem. Eng. News,* 91, 33-37.
5. Ming, J., Guo, J., Xia, C., Wang, W., & Alshareef, H. N., 2019. Zinc-ion batteries: Materials, mechanisms, and applications. *Materials Science and Engineering: R: Reports,* 135, 58-84. http://doi.org/10.1016/ j.mser.2018.10.002.
6. Li, H., Ma, L., Han, C., Wang, Z., Liu, Z., Tang, Z., & Zhi, C., 2019. Advanced rechargeable zinc-based batteries: Recent progress and future perspectives. *Nano Energy.* *http://doi.org/*10.1016/ j.nanoen.2019.05.059.
7. Li, Z., Young, D., Xiang, K., Carter, W. C., & Chiang, Y. M., 2013. Towards high power high energy aqueous sodium-ion batteries: the NaTi2 (PO4) 3/ Na0. 44MnO2 system. *Advanced Energy Materials,* 3(3), 290-294. http://doi.org/10.1002/ aenm.201200598.
8. Wessells, C. D., Peddada, S. V., Huggins, R. A., & Cui, Y., 2011. Nickel hexacyanoferrate nanoparticle electrodes for aqueous sodium and potassium ion batteries. *Nano letters,* 11(12), 5421-5425. http://doi.org/10.1021/ nl203193q.
9. Kundu, D., Adams, B. D., Duffort, V., Vajargah, S. H., & Nazar, L. F., 2016. A high-capacity and long-life aqueous rechargeable zinc battery using a metal oxide intercalation cathode. *Nature Energy,* 1(10), 1-8. http://doi.org/ 10.1038/ nenergy.2016.119.
10. Zhang, S. S., 2007. A review on the separators of liquid electrolyte Li-ion batteries. *Journal of power sources,* 164(1), 351-364. http://doi.org/10.1016/ j.jpowsour.2006.10.065.
11. Yang, C. C., & Lin, S. J., 2002 Alkaline composite PEO-PVA-glass-fibre-mat polymer electrolyte for Zn-air battery. *Journal of Power Sources,* 112(2), 497-503. http://doi.org/
12. Guinot, S., Salmon, E., Penneau, J. F., & Fauvarque, J. F., 1998. A new class of PEO-based SPEs: structure, conductivity and application to alkaline secondary batteries. *Electrochimica Acta,* 43(10-11), 1163-1170. http:// doi.org/10.1016/50378-7753(02)00438-X.
13. Patel, S. K., Awadhia, A., & Agrawal, S. L., 2009. Thermal and electrical studies on composite gel electrolyte system: PEG-PVA-(NH4CH2CO2) 2. *Phase Transitions,* 82(6), 421-432. http://doi.org/10.1080/ 01411590902722363.
14. Tsuchida, E., Ohno, H., & Tsunemi, K., 1983. Conduction of lithium ions in polyvinylidene fluoride and its derivatives—I. *Electrochimica Acta,* 28(5), 591-595. http://doi.org/10.1016/0013-4686(83)85049-X.
15. Mohamad, A. A., Mohamed, N. S., Yahya, M. Z. A., Othman, R., Ramesh, S., Alias, Y., & Arof, A. K., 2003. Ionic conductivity studies of poly (vinyl alcohol) alkaline solid polymer electrolyte and its use in nickel-zinc cells. *Solid State Ionics,* 156(1-2), 171-177. http://doi.org/ 10.1016/ S0167-2738(02)00617-3.
16. Tsunemi, K., Ohno, H., & Tsuchida, E., 1983. A mechanism of ionic conduction of poly (vinylidene fluoride)-lithium perchlorate hybrid films. *Electrochimica Acta,* 28(6), 833-837. http://doi.org/10.1016/0013-4686(83) 85155-X.
17. Park, J., Park, M., Nam, G., Lee, J. S., & Cho, J., 2015. All-solid-state cable-type flexible zinc-air battery. *Advanced Materials,* 27(8), 1396-1401. http://doi.org/ 10.1002/ adma.201404639.
18. Wu, G. M., Lin, S. J., & Yang, C. C., 2006 Alkaline Zn-air and Al-air cells based on novel solid PVA/PAA polymer electrolyte membranes. *Journal of Membrane Science,* 280(1-2), 802-808. http://doi.org/10.1016/ j.memsci.2006.02.037.
19. Lewandowski, A., Skorupska, K., & Malinska, J., 2000. Novel poly (vinyl alcohol)-KOH—H2O alkaline polymer electrolyte. *Solid state ionics,* 133(3-4), 265-271. http:// doi.org/10.1016/ S0167-2738(00)00733-5.
20. Hagan, W. P., Latham, R. J., Linford, R. G., & Vickers, S. L., 1994. Zinc polymer electrolytes in battery systems. *Solid State Ionics,* 70, 666-669. http://doi.org/10.1016/ 0167-2738(94)90391-3.
21. Fauvarque, J. F., Guinot, S., Bouzir, N., Salmon, E., & Penneau, J. F., 1995 Alkaline poly (ethylene oxide) solid polymer electrolytes. Application to nickel secondary batteries. *Electrochimica Acta,* 40(13-14), 2449-2453. http://doi.org/10.1016/0013-4686(95)00212-W.
22. Kumar, G. G., & Sampath, S., 2003. Electrochemical characterization of poly (vinylidenefluoride)-zinc triflate gel polymer electrolyte and its application in solid-state zinc batteries. *Solid State Ionics,* 160(3-4), 289-300. http://doi.org/10.1016/ S0167-2738(03)00209-1.

23. Kumar, G. G., & Sampath, S., 2003. Electrochemical characterization of a zinc-based gel-polymer electrolyte and its application in rechargeable batteries. *Journal of The Electrochemical Society,* 150(5), A608-A615. http://doi.org/10.1149/1.1566017.

24. Merle, G., Hosseiny, S. S., Wessling, M., & Nijmeijer, K., 2012. New cross-linked PVA based polymer electrolyte membranes for alkaline fuel cells. *Journal of membrane science,* 409, 191-199. http://doi.org/10.1016/j.memsci.2012.03.056.

25. Santos, F., Tafur, J. P., Abad, J., & Romero, A. J. F., 2019. Structural modifications and ionic transport of PVA-KOH hydrogels applied in Zn/Air batteries. *Journal of Electroanalytical Chemistry,* 850, 113380. http://doi.org/10.1016/j.jelechem.2019.113380.

26. Li, H., Han, C., Huang, Y., Huang, Y., Zhu, M., Pei, Z., . . . & Wang, Y., 2018. An extremely safe and wearable solid-state zinc ion battery based on a hierarchical structured polymer electrolyte. *Energy & Environmental Science,* 11(4), 941-951. http://doi.org/10.1039/C7EE03232C.

27. Feldman, D., & Barbalata, A., 1996. *Synthetic polymers: technology, properties, applications.* Springer Science & Business Media.

28. Molyneux, P., 2018. *Water-soluble synthetic polymers: volume II. properties and behavior.* CRC press.

29. Poosapati, A., Jang, E., Madan, D., Jang, N., Hu, L., & Lan, Y., 2019. Cellulose hydrogel as a flexible gel electrolyte layer. *MRS Communications,* 9(1), 122-128. http://doi.org/10.1557/mrc.2019.9.

30. Poosapati, A., Negrete, K., Jang, N., Hu, L., Lan, Y., & Madan, D., 2019. Wood cellulose-based thin gel electrolyte with enhanced ionic conductivity. *MRS Communications,* 9(3), 1015-1021. http://doi.org/10.1557/mrc.2019.79.

31. Rinaudo, M., 2006. Chitin and chitosan: properties and applications. *Progress in polymer science,* 31(7), 603-632. http://doi.org/10.1016/j.progpolymsci.2006.06.001.

32. Chai, L., Qu, Q., Zhang, L., Shen, M., Zhang, L., & Zheng, H., 2013. Chitosan, a new and environmental benign electrode binder for use with graphite anode in lithium-ion batteries. *Electrochimica Acta,* 105, 378-383. http://doi.org/10.1016/j.electacta.2013.05.009.

33. Subban, R. H. Y., Arof, A. K., & Radhakrishna, S., 1996. Polymer batteries with chitosan electrolyte mixed with sodium perchlorate. *Materials Science and Engineering: B,* 38(1-2), 156-160. http://doi.org/10.1016/0921-5107(95)01508-6.

34. Yusof, Y. M., Illias, H. A., & Kadir, M. F. Z., 2014. Incorporation of NH 4 Br in PVA-chitosan blend-based polymer electrolyte and its effect on the conductivity and other electrical properties. *Ionics,* 20(9), 1235-1245. http://doi.org/10.1007/s11581-014-1096-1.

35. Alias, S. S., Chee, S. M., & Mohamad, A. A., 2017. Chitosan-ammonium acetate-ethylene carbonate membrane for proton batteries. *Arabian Journal of Chemistry,* 10, S3687-S3698. http://doi.org/10.1016/j.arabjc.2014.05.001.

36. Aziz, S. B., Abdullah, O. G., Rasheed, M. A., & Ahmed, H. M., 2017. Effect of high salt concentration (HSC) on structural, morphological, and electrical characteristics of chitosan based solid polymer electrolytes. *Polymers,* 9(6), 187. http://doi.org/10.3390/polym9060187.

37. Smitha, B., Sridhar, S., & Khan, A. A., 2004. Polyelectrolyte complexes of chitosan and poly (acrylic acid) as proton exchange membranes for fuel cells. *Macromolecules,* 37(6), 2233-2239. http://doi.org/10.1021/ma0355913.

38. Shukur, M. F., Ithnin, R., Illias, H. A., & Kadir, M. F. Z., 2013. Proton conducting polymer electrolyte based on plasticized chitosan—PEO blend and application in electrochemical devices. *Optical Materials,* 35(10), 1834-1841. http://doi.org/10.1016/j.optmat.2013.03.004.

39. Kadir, M. F. Z., & Arof, A. K., 2011. Application of PVA—chitosan blend polymer electrolyte membrane in electrical double layer capacitor. *Materials Research Innovations,* 15(sup2), s217-s220. http://doi.org/10.1179/143307511X13031890749299.

40. Chupp, J Shellikeri, A., Palui, G., & Chatterjee, J 2015. Chitosan-based gel film electrolytes containing ionic liquid and lithium salt for energy storage applications. *Journal of Applied Polymer Science,* 132(26). http://doi.org/10.1002/app.42143.

41. Yamagata, M., Soeda, K., Ikebe, S., Yamazaki, S., & Ishikawa, M., 2013. Chitosan-based gel electrolyte containing an ionic liquid for high-performance nonaqueous supercapacitors. *Electrochimica Acta,* 100, 275-280. http://doi.org/10.1016/j.electacta.2012.05.073.

42. Bhad, S. N., & Sangawar, V. S., 2012. Synthesis and study of PVA based gel electrolyte. *Chem Sci Trans,* 1(3), 653-657. http://doi.org/10.7598/cst2012.253.

43. Yadav, G. G., Gallaway, J. W., Turney, D. E., Nyce, M., Huang, J., Wei, X., & Banerjee, S., 2017. Regenerable Cu-intercalated MnO 2 layered cathode for highly cyclable energy dense batteries. *Nature communications,* 8(1), 1-9. http://doi.org/10.1038/ncomms14424.

44. Huang, J Yadav, G. G., Gallaway, J. W., Wei, X., Nyce, M., & Banerjee, S., 2017. A calcium hydroxide interlayer as a selective separator for rechargeable alkaline Zn/MnO2 batteries. *Electrochemistry Communications,* 81, 136-140. http://doi.org/10.1016/j.elecom.2017.06.020.

45. Yadav, G. G., Cho, J., Turney, D., Hawkins, B., Wei, X., Huang, J., & Nyce, M., 2019. Going beyond Intercalation Capacity of Aqueous Batteries by Exploiting Conversion Reactions of Mn and Zn electrodes for Energy-Dense Applications. *Advanced Energy Materials,* 9(48), 1902270. http://doi.org/10.1002/aenm.201902270.

46. Biswal, A., Tripathy, B. C., Sanjay, K., Subbaiah, T., & Minakshi, M., 2015. Electrolytic manganese dioxide (EMD): a perspective on worldwide production, reserves and its role in electrochemistry. *RSC Advances,* 5(72), 58255-58283. http://doi.org/10.1039/C5RA05892A.

47. Nesvaderani, F., Bonakdarpour, A., & Wilkinson, D. P., 2017. pH-Controlled Electrolysis of Electrolytic Manganese Dioxide (EMD) for Improved Cycle Life of Rechargeable MnO2/ Zn Batteries. *Journal of The Electrochemical Society,* 164(4), A810-A819. http://doi.org/10.1149/2.0951704jes.

48. Yadav, G. G., Wei, X., Huang, J., Gallaway, J. W., Turney, D. E., Nyce, M., . . . & Banerjee, S., 2017. A conversion-based highly energy dense Cu 2+ intercalated Bi-birnessite/Zn alkaline battery. *Journal of Materials Chemistry A,* 5(30), 15845-15854. http://doi.org/10.1039/C7TA05347A.

49. Mehta, S. A., Bonakdarpour, A., & Wilkinson, D. P., 2017. Impact of cathode additives on the cycling performance of rechargeable alkaline manganese dioxide—zinc batteries for energy storage applications. *Journal of Applied Electrochemistry,* 47(2), 167-181. http://doi.org/10.1007/s10800-016-1034-1.

50. Yadav, G. G., Wei, X., Huang, J Turney, D., Nyce, M., & Banerjee, S., 2018. Accessing the second electron capacity of MnO2 by exploring complexation and intercalation reactions in energy dense alkaline batteries. *International Journal of Hydrogen Energy*, 43(17), 8480-8487. http://doi.org/10.1016/ j.ijhydene.2018.03.061.

51. Wang, Z., Winslow, R., Madan, D., Wright, P. K., Evans, J. W., Keif, M., & Rong, X., 2014. Development of MnO2 cathode inks for flexographically printed rechargeable zinc-based battery. *Journal of Power Sources*, 268, 246-254. http://doi.org/10.1016/ j.jpowsour.2014.06.032.

52. Ho, C. C., Evans, J. W., & Wright, P. K., 2010. Direct write dispenser printing of a zinc microbattery with an ionic liquid gel electrolyte. *Journal of Micromechanics and Microengineering*, 20(10), 104009. http://doi.org/10.1088/0960-1317/20/10/104009.

53. Kadir, M. F. Z., Majid, S. R., & Arof, A. K., 2010. Plasticized chitosan—PVA blend polymer electrolyte-based proton battery. *Electrochimica Acta*, 55(4), 1475-1482. http://doi.org/10.1016/ j.electacta.2009.05.011.

54. Fan, L., Wang, M., Zhang, Z., Qin, G., Hu, X., & Chen, Q., 2018. Preparation and Characterization of PVA Alkaline Solid Polymer Electrolyte with Addition of Bamboo Charcoal. *Materials*, 11(5), 679. http://doi.org/10.3390/ ma11050679.

55. Yahya, M. Z. A., Harun, M. K., Ali, A. M. M., Mohammat, M. F., Hanafiah, M. A. K. M., Ibrahim, S. C., . . . & Latif, F., 2006. XRD and surface morphology studies on chitosan-based film electrolytes. *Journal of applied sciences*, 6(15), 3510-3154. http://doi.org/10.3923/ jas.2006.3150.3154.

56. Mulchandani, N., Shah, N., & Mehta, T., 2017. Synthesis of chitosan-polyvinyl alcohol copolymers for smart drug delivery application. *Polymers and Polymer Composites*, 25(3), 241-246. http://doi.org/10.1177/ 096739111702500311.

57. Navaratnam, S., Ramesh, K., Ramesh, S., Sanusi, A., Basirun, W. J., & Arof, A. K., 2015. Transport mechanism studies of chitosan electrolyte systems. Electrochimica Acta, 175, 68-73. http://doi.org/10.1016/ j.electacta.2015.01.087.

58. Tripathi, S., Mehrotra, G. K., & Dutta, P. K., 2009. Physicochemical and bioactivity of cross-linked chitosan—PVA film for food packaging applications. International Journal of Biological Macromolecules, 45(4), 372-376. http://doi.org/10.1016/ j.ijbiomac.2009.07.006.

59. Bajpai, M., Bajpai, S. K., & Jyotishi, P., 2016. Water absorption and moisture permeation properties of chitosan/poly (acrylamide-co-itaconic acid) IPC films. International journal of biological macromolecules, 84, 1-9. http://doi.org/10.1016/ j.ijbiomac.2015.11.088.

60. Pan, H., Ellis, J. F., Li, X., Nie, Z., Chang, H. J., & Reed, D., 2019. Electrolyte Effect on the Electrochemical Performance of Mild Aqueous Zinc-Electrolytic Manganese Dioxide Batteries. *ACS applied materials & interfaces*, 11(41), 37524-37530. http://doi.org/10.1021/ acsami.9b09252.

61. Powers, R. W., & Breiter, M. W., 1969. The anodic dissolution and passivation of zinc in concentrated potassium hydroxide solutions. *Journal of the Electrochemical Society*, 116(6), 719-729. http://doi.org/10.1149/ 1.2412040.

62. Lu, K., Song, B., Zhang, Y., Ma, H., & Zhang, J., 2017. Encapsulation of zinc hexacyanoferrate nanocubes with manganese oxide nanosheets for high-performance rechargeable zinc ion batteries. *Journal of Materials Chemistry A*, 5(45), 23628-23633. http://doi.org/10.1039/ C7TA07834J.

63. Guo, F., Gupta, N., & Teng, X., 2018. Enhancing Pseudocapacitive Process for Energy Storage Devices: Analyzing the Charge Transport Using Electro-kinetic Study and Numerical Modeling. *Supercapacitors: Theoretical and Practical Solutions*, 87. http://doi.org/ 10.5772/ intechopen.73680.

64. Guisao, J. P. T., & Romero, A. J. F., 2015. Interaction between Zn2+ cations and n-methyl-2-pyrrolidone in ionic liquid-based Gel Polymer Electrolytes for Zn batteries. *Electrochimica Acta*, 176, 1447-1453. http:// doi.org/10.1016/ j.electacta.2015.07.132.

65. Minakshi, M., Mitchell, D. R., Carter, M. L., Appadoo, D., & Nallathamby, K., 2009. Microstructural and spectroscopic investigations into the effect of CeO2 additions on the performance of a MnO2 aqueous rechargeable battery. *Electrochimica acta*, 54(12), 3244-3249. http:// doi.org/10.1016/ j.electacta.2008.12.029.

66. Seo, J. K., Shin, J., Chung, H., Meng, P. Y., Wang, X., & Meng, Y. S., 2018. Intercalation and conversion reactions of nanosized 13-MnO2 cathode in the secondary Zn/MnO2 alkaline battery. *The Journal of Physical Chemistry C*, 122(21), 11177-11185. http://doi.org/ 10.1021/ acs.jpcc.7b11685.

67. Jiao, T., Yang, Q., Wu, S., Wang, Z., Chen, D., Shen, D., . . . & Zhi, C., 2019. Binder-free hierarchical VS 2 electrodes for high-performance aqueous Zn ion batteries towards commercial level mass loading. Journal of Materials Chemistry A, 7(27), 16330-16338. http://doi.org/ 10.1039/ C9TA04798K.

What is claimed is:

1. A method of making a zinc-based alkaline battery, said method comprising:

coating a first current collector with a cathode ink to form a cathode ink layer thereon;

positioning a gel electrolyte on the cathode ink layer, wherein the gel electrolyte comprises an amorphous solid structure comprising chitosan, polyvinyl alcohol (PVA) and an alkali hydroxide, wherein the amorphous solid structure has a weight ratio of chitosan:PVA of about 1:(0.1-0.4);

positioning a layer comprising zinc onto the gel electrolyte;

positioning a second current collector onto the layer comprising zinc; and compressing the layers together to yield the zinc-based alkaline battery.

2. The method of claim 1, wherein the current collectors comprise carbon cloth or a foil comprising nickel or an alloy thereof.

3. The method of claim 2, wherein the carbon cloth current collectors are activated using nitric acid prior to coating or positioning.

4. The method of claim 1, wherein the cathode ink comprises electrolytic manganese dioxide (EMD).

5. The method of claim 4, wherein the cathode ink further comprises at least one conducting agent, chitosan solution, water, and optionally at least one dispersing agent.

6. The method of claim 1, wherein the gel electrolyte further comprises alkali hydroxide in pores of the amorphous solid structure.

7. The method of claim 6, further comprising substantially coating the gel electrolyte with a chitosan-based polymer gel electrolyte solution prior to positioning on the cathode ink layer, wherein the chitosan-based polymer gel electrolyte solution comprises a mixture of chitosan, PVA and alkali hydroxide.

8. The method of claim 6, wherein the gel electrolyte is swollen and has a swelling ratio of at least 1.0.

9. The method of claim 1, wherein the layer comprising zinc is a foil comprising zinc or an alloy thereof.

10. The method of claim 1, wherein each layer is flexible or at least one layer is substantially inflexible.

11. The method of claim 1, wherein the alkali hydroxide comprises KOH or NaOH.

12. The method of claim 1, wherein the amorphous solid structure has a weight ratio of (chitosan-PVA):KOH of about 1:(0.2-0.4).

13. A method of making a zinc-based alkaline battery, said method comprising:

coating a first current collector with a cathode ink to form a cathode ink layer thereon;

positioning a substantially coated gel electrolyte on the cathode ink layer, wherein the substantially coated gel electrolyte comprises (i) a gel electrolyte comprising an amorphous solid structure comprising chitosan, polyvinyl alcohol (PVA) and an alkali hydroxide, and (ii) a viscous coating comprising a chitosan-based polymer gel electrolyte solution comprising a mixture of chitosan, PVA and KOH;

positioning a layer comprising zinc onto the viscous coating of the substantially coated gel electrolyte;

positioning a second current collector onto the layer comprising zinc; and compressing the layers together to yield the zinc-based alkaline battery.

14. The method of claim 13, wherein the cathode ink comprises electrolytic manganese dioxide (EMD).

15. The method of claim 14, wherein the cathode ink further comprises at least one conducting agent, chitosan solution, water, and optionally at least one dispersing agent.

16. The method of claim 13, wherein the gel electrolyte further comprises alkali hydroxide in pores of the amorphous solid structure.

17. The method of claim 16, wherein the gel electrolyte is swollen and has a swelling ratio of at least 1.0.

18. The method of claim 13, wherein the layer comprising zinc is a foil comprising zinc or an alloy thereof.

19. The method of claim 13, wherein each layer is flexible or at least one layer is substantially inflexible.

20. The method of claim 13, wherein the alkali hydroxide comprises KOH or NaOH.

* * * * *